(12) United States Patent
Fujimoto et al.

(10) Patent No.: US 8,279,522 B2
(45) Date of Patent: Oct. 2, 2012

(54) APPARATUS FOR AUTOMATICALLY INTRODUCING CELESTIAL OBJECT, TERMINAL DEVICE AND CONTROL SYSTEM FOR ASTRONOMICAL TELESCOPE

(75) Inventors: Norimasa Fujimoto, Saitama (JP); Mitsuaki Hirono, Saitama (JP)

(73) Assignee: Vixen Co., Ltd., Saitama (JP)

( * ) Notice: Subject to any disclaimer, the term of this patent is extended or adjusted under 35 U.S.C. 154(b) by 19 days.

(21) Appl. No.: 12/816,630

(22) Filed: Jun. 16, 2010

(65) Prior Publication Data

US 2010/0302633 A1  Dec. 2, 2010

Related U.S. Application Data

(62) Division of application No. 10/559,141, filed on Nov. 30, 2005, now Pat. No. 7,769,475.

(30) Foreign Application Priority Data

May 30, 2003 (WO) .................. PCT/JP03/06877
May 31, 2004 (WO) .................. PCT/JP2004/007496

(51) Int. Cl.
    *G02B 23/00* (2006.01)
(52) U.S. Cl. ........... 359/430; 700/59; 359/399; 359/429
(58) Field of Classification Search .............. 700/59; 359/430, 399, 429
    See application file for complete search history.

(56) References Cited

U.S. PATENT DOCUMENTS

| | | | |
|---|---|---|---|
| 3,015,249 A | 1/1962 | Taylor | |
| 4,682,091 A | 7/1987 | Krewalk et al. | |
| 6,304,376 B1 * | 10/2001 | Baun et al. | 359/429 |
| 6,369,942 B1 | 4/2002 | Hedrick et al. | |
| 7,081,917 B2 | 7/2006 | Shimoyama et al. | |
| 2002/0152620 A1 | 10/2002 | Lemp, III | |
| 2004/0068564 A1 | 4/2004 | Snoddy et al. | |
| 2004/0233521 A1 * | 11/2004 | McWilliams | 359/399 |

FOREIGN PATENT DOCUMENTS

| | | |
|---|---|---|
| CN | 1328742 | 12/2001 |
| CN | 1405529 | 3/2003 |
| JP | 04-106513 | 4/1992 |
| JP | 05-282225 | 10/1993 |

(Continued)

OTHER PUBLICATIONS

English translation of Chinese Office from corresponding Chinese Patent Application 2008100004257.

(Continued)

*Primary Examiner* — Tejal Gami

(74) *Attorney, Agent, or Firm* — Harness, Dickey & Pierce, P.L.C.

(57) ABSTRACT

A terminal device of an apparatus to automatically introduce a target celestial object includes an input operation section executing a command operation on the apparatus. An image display section indicates a star map image in accordance with a display scale factor. The input operation section includes a rotation command means that executes a rotational driving of the astronomical telescope in a telescope control mode. A scale factor input means executes an input specification of the display scale factor for the displayed star map image, which corresponds to a position on a celestial sphere toward which the astronomical telescope is headed, while a speed of rotation of the astronomical telescope controlled by the rotation command means changes in accordance with a decreasing function of the display scale factor.

9 Claims, 20 Drawing Sheets

FOREIGN PATENT DOCUMENTS

| | | |
|---|---|---|
| JP | 11-072718 | 6/1999 |
| JP | 11-211993 | 8/1999 |
| JP | 2000-305024 | 11/2000 |
| JP | 2001-343592 | 12/2001 |
| JP | 2002-048982 | 2/2002 |
| JP | 2002-152809 | 5/2002 |
| JP | 2002-191547 | 7/2002 |
| JP | 2003-015673 | 1/2003 |
| WO | WO 00/19695 | 4/2000 |

OTHER PUBLICATIONS

English translation of Chinese Office from corresponding Chinese Patent Application 2008100004261.
English translation of Japanese Office Action from corresponding Japanese Patent Application 2005-506526.
International Search Report for PCT/JP2004/007496, dated Sep. 1, 2004.

* cited by examiner

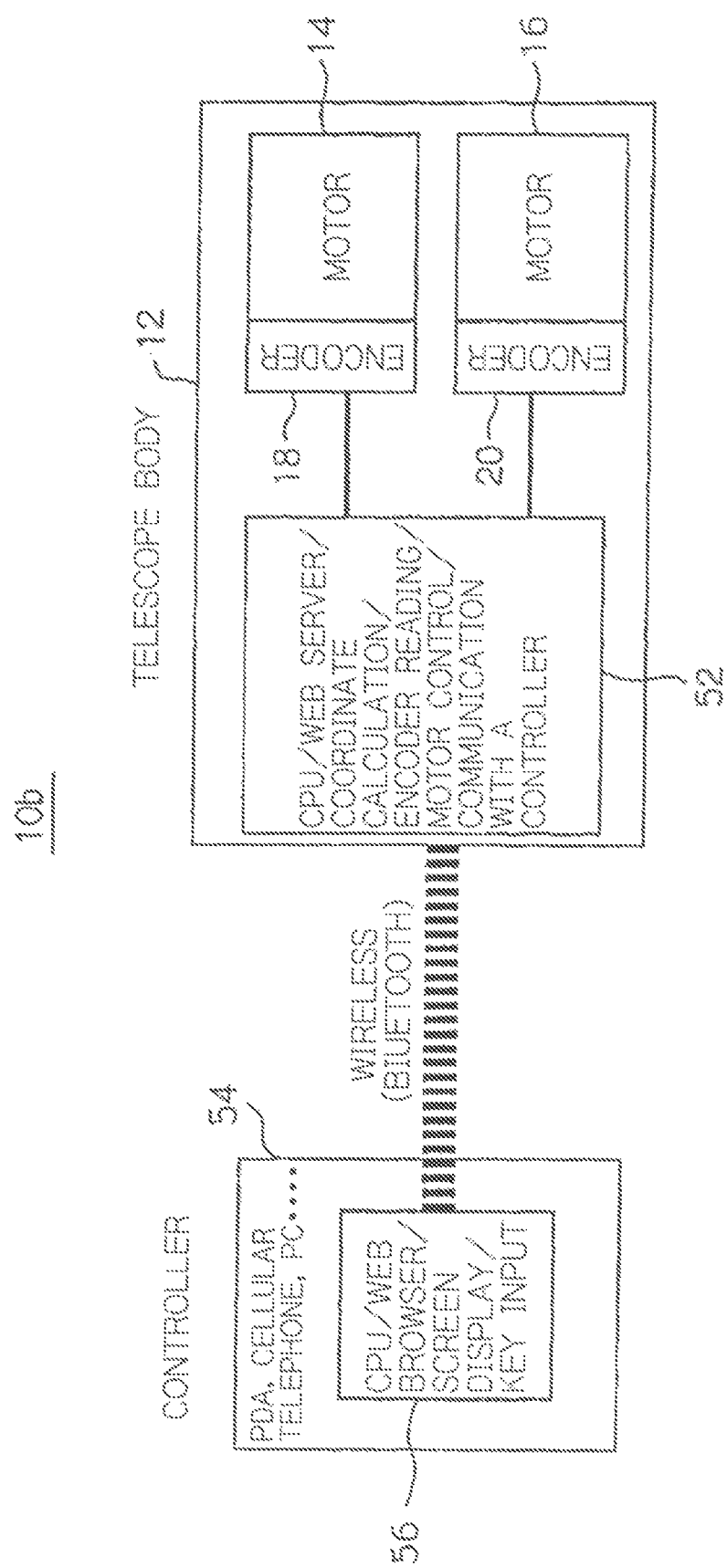

Fig. 9
A. 1 : 1 CONTROL
B. 1 : N CONTROL
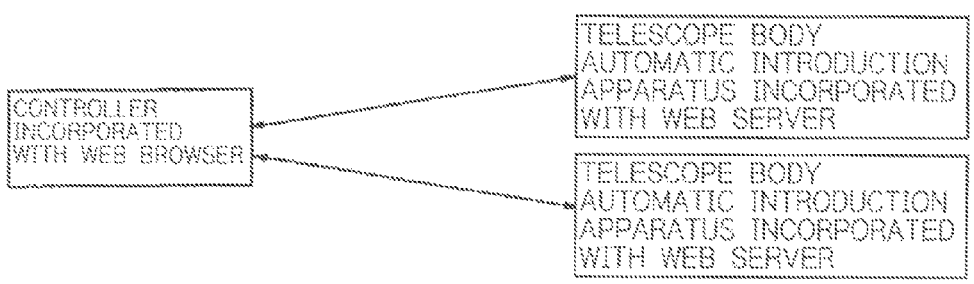
D. N : 1 CONTROL
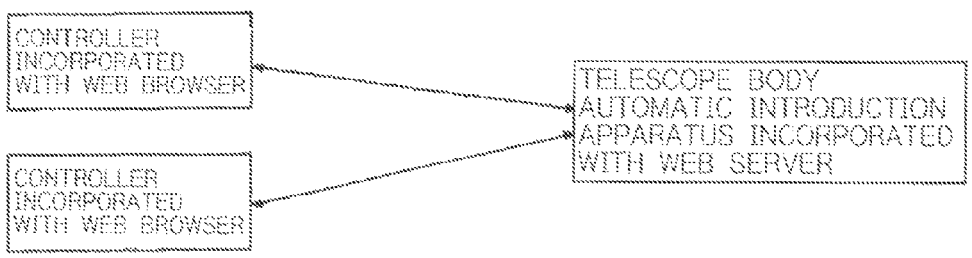
C. N : M CONTROL
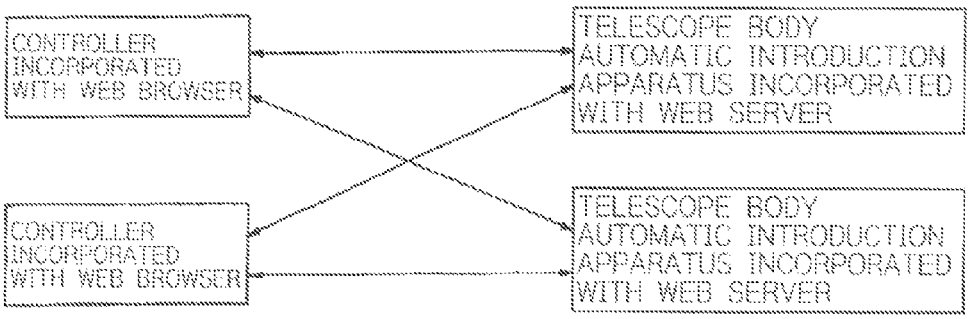

APPARATUS FOR AUTOMATICALLY INTRODUCING CELESTIAL OBJECT, TERMINAL DEVICE AND CONTROL SYSTEM FOR ASTRONOMICAL TELESCOPE

CROSS-REFERENCE TO RELATED APPLICATION

This application is a divisional application of U.S. patent application Ser. No. 10/559,141 filed on Nov. 30, 2005, which is a National Phase application of PCT/JP2004/007496 filed on May 31, 2004; which claims priority to PCT/JP2003/006877 filed May 30, 2003. The disclosures of the above applications are incorporated herein by reference.

FIELD OF THE INVENTION

The present invention relates to an automatic introduction apparatus for automatically introducing a celestial object in an image-capturing device, such as a telescope and a camera, as well as a terminal device for controlling the automatic introduction apparatus and a control system for an astronomical telescope.

DESCRIPTION OF THE PRIOR ART

There has been provided an astronomical telescope having two rotation axes in orthogonal relationship, which is equipped with a function of automatic introduction for applying a rotational control to the astronomical telescope around two rotation axes such that if a user inputs directly or designates selectively a name of a celestial object desired to be observed, the target celestial object can be seen in a field-of-view of the astronomical telescope.

An astronomical telescope equipped with such an automatic introduction function (hereinafter referred to as "an automatic introduction type telescope") generally comprises, for each axis, a motor connected to the telescope so as to rotate it around each of the axes, an encoder connected to a shaft of each motor for counting and outputting a motor revolution, a motor control section for driving and controlling the motors and a processor for arithmetically processing a command required for the automatic introduction based on a set of information input by the user and an output signal from the encoder. Further, a telescope mount is provided with a handheld controller (hereinafter, also referred to as "a handset"), one controller per each mount, connected via a cable, to enable the user to manipulate the telescope.

The handset comprises an input operation section for enabling a user to input a set of information and/or commands to be required for introducing a celestial object automatically and a display section operating associatively with the input operation section to indicate a current state of the telescope (a mode, a right ascension and a declination to which the telescope is headed), a set of information relating to a target celestial object and a user interface screen including a guidance for initial setting and the like.

It is also occasionally required in a telescope of automatic introduction type to manually make a minute correction to the orientation of the telescope when the telescope is desired to be rotated around the axes during the initial setting and/or in a case of failure where the target celestial object has not been fully introduced in a center of field due to an error. To address this, the input operation section of the handset is provided with a group of movement command buttons for causing the telescope to make a rotational movement in the forward and backward directions around two axes respectively and is also separately provided with a speed command means for providing a command on a rotational speed (a motor speed) around each axis when shifting the orientation of the telescope. This speed command means provides, for example, a set of buttons, each being associated with a high, intermediate, low or ultra-low speed. To introduce the celestial object by manual operation, the user typically resets the motor speed in response to the current scale factor employed by the telescope in such a manner that if the current scale factor is lower, then the user sets the motor to rotate at the high speed, and if the current scale factor is high, then the user sets the motor to rotate at the ultra-low speed, thus providing a reliable manual introduction of the celestial object into the center of the field in a short time. Further, quick and reliable manual introduction of the celestial object can be also provided by resetting the motor speed in response to an elongation from the target celestial object in such a manner that if the direction in which the telescope is pointed is far from the target celestial object, then the high speed button is pressed, and as it approaches the target celestial object, the low speed button is pressed.

It is to be noted in an automatic introduction type telescope that in advance of the automatic introduction, the user has to provide, for a processor of the telescope, a set of information including a longitude and latitude of an observation site, a date and time and in which direction in the celestial sphere the telescope is pointed, after having pointed the telescope in a predetermined direction. With an early version of an automatic introduction type telescope, a user is typically required to input the longitude and latitude of the observation site in advance using the handset, while the date and time are provided by a clock incorporated therein. To detect the direction in which the telescope is actually pointed, in a condition where a mount is securely held in a horizontal state in the altazimuth instrument or a polar axis is precisely aligned in the equatorial instrument, the user selects at least one star, typically at least two stars, as fundamental star(s) as a point(s) of reference, and actually introduces the fundamental star(s) into the field of the telescope to thereby notify the processor in which direction the telescope is pointed (i.e., the alignment).

Recently, a so-called "fully-automated telescope", has been developed, which allows such an initial setting operation to be automatically carried out in an advanced manner. This type of fully-automated telescope is intended to provide a fully-automated operation of the initial setting, that has been previously carried out manually, by automatically identifying the longitude and latitude of the observation site, the date and time and the direction in which the telescope is pointed with the aid of the GPS (Global Positioning System), a horizontal sensor, a magnetic sensor and so on.

SUMMARY OF THE INVENTION

Problem to be Solved by the Invention

However, the automatic introduction type telescope according to the prior art as described above has the following problems.

(1) Problems Concerning a User Interface

In the prior art, the display section of the handset provides a user interface using characters primarily, presented only by text, in a size as large as 16-colums×2-rows of characters, for example. In association with this, the input operation section employs a set of buttons, wherein the user has to make a direct input of a specific name of a celestial object desired to be introduced automatically, by pressing buttons in the input operation section one after another. Further, when selecting the fundamental star(s) for the alignment, firstly a small number of fundamental stars are sequentially displayed in the display section, and secondly the user can make a selection only from those displayed, due to the limited capability of the display section, that shows only a few rows of text.

For the alignment, the user must have previous knowledge of where a fundamental star is located, or the system only can be used after the name of a celestial object having been determined using a separate planisphere. In addition, as described above, a gang control has not been employed between the telescope scale factor and the motor speed or between the elongation to the target celestial object and the motor speed for the manual introduction of the target celestial object during the alignment process, but the control has relied on a user's input. As is apparent from this fact, this type of prior art system, even though it is known as the automatic introduction type, has still been considered difficult for a beginner to operate.

(2) Problems Concerning the Handset

Since the automatic introduction apparatus, especially the handset, of the astronomical telescope according to the prior art is a dedicated apparatus that has been developed exclusively for a specific model type, it is generally manufactured in small numbers and is thus expensive. This has eliminated any freedom for the user to select his/her favorite type of handset.

Still further, since the handset and the telescope are connected via a cable as described above, handling thereof is troublesome, and there are some inconveniences, such as where a cable may be caught somewhere especially in night use.

(3) Restrictions on the Control

Since the connection between the telescope and the handset according to the prior art has been provided for the purpose of carrying out transmission of a simple control and/or position signal(s), the length of the cable has been restricted from a few meters to some ten meters in order to keep the signal deterioration within an acceptable range. This has inhibited the control of the telescope remotely by using the handset.

Further, because a single hand set can only control a single telescope in the prior art, a plurality of handsets has to be provided and manipulated on such an occasion as an astronomical observation and viewing session where a plurality of telescopes is provided in order to observe the same object at the same time. In another case where two or more observers desire to use a single unit of telescope at the same time, there is no other way than that a pair of telescope and handset is used by each individual.

(4) Low Precision in Automatic Introduction

The automatic introduction type telescope typically allows the target celestial object to be introduced into the field with a certain level of precision, so long as the correct initial setting has been accomplished. However, since mechanical errors associated with the mount, including orthogonal errors between two rotation axes, have inherently existed, it has been extremely difficult to achieve the automatic introduction with such a pin-point precision that allows the target celestial object to be introduced into the center of the field, even at a high scale factor. Therefore, a minor adjustment operation has been typically required for adjusting the orientation of the telescope minutely in order to accommodate the target celestial object in the center of the field after the automatic introduction of the object.

On the other hand, the fully automated telescope is intended to solve partially the above-described problems concerning the user interface by providing a fully automated initial setting operation. In actual practice, however, since a plurality of sensors is used in the initial setting, detection errors from respective sensors can be accumulated, and since especially the magnetic sensor, among others, provides a significant detection error, it has been difficult to obtain a satisfactory initial setting precision, and accordingly if the automatic introduction is carried out in the above described condition, then the actual introduction precision could be reduced to an extremely low level. Consequently, an alignment process by the user is required in order to improve the precision in the initial setting, similarly to the prior art system, and thus, even if an initial setting of high precision could be established, it would mean actually that the problem of deteriorated introduction precision resultant from the mechanical errors has not yet been solved, as is the exact case with the earlier version of the automatic introduction type telescope.

Therefore, the fully-automated telescope of the prior art has not yet accomplished its original goal.

(5) Insufficient Real-Time Response to an Astronomical Phenomenon

The automatic introduction type telescope of the prior art comprises a ROM located in a control substrate, which includes a stored database containing a set of a position and other information relating to respective celestial objects. The ROM is, however, not rewritable and therefore not able to accommodate the guidance involving an astronomical phenomenon that varies from hour to hour and/or the automatic introduction of an unexpectedly emerging celestial object, such as a new comet and a super nova.

It is conceptually possible to cope with the varying astronomical phenomena by connecting the telescope to a personal computer linked to the Internet and providing the control using the personal computer. However, quite a high operational skill would be necessary to completely master a method to determine which site the correct information can be obtained from and how it can be executed using the software in the personal computer, and this requirement falls out of the concept of fully-automated operation of the telescope.

As a whole, it is hard to say that the automatic introduction type telescope in the current stage has successfully realized a user-friendly system, especially for a beginner, an intermediate-grade user, and working people having limited available time.

Means to Solve the Problem

To solve the above problem, in one aspect of the present invention, provided is a terminal device connectable to an automatic introduction apparatus for automatically introducing a target celestial object by controlling a rotation of an astronomical telescope around at least two axes, the terminal device being characterized in comprising: an input operation section for executing a command operation on the automatic introduction apparatus; and an image display section for indicating a star map image for a predetermined area on a celestial sphere in accordance with a scale factor, in which the input operation section is provided with: a rotation command means for executing a command input to cause the astronomical telescope to rotate around at least two axes respectively in a telescope control mode; and a scale factor input means for executing an input specification of the display scale factor for the star map image displayed in the image display section, wherein in the telescope control mode, a star map image corresponding to a position on a celestial sphere toward which the astronomical telescope is headed is displayed in the image display section, while a speed of rotation of the astronomical telescope controlled by the rotation command means is changed in accordance with a decreasing function of the display scale factor specified by the scale factor input means.

According to the above-described aspect of the present invention, in the telescope control mode, the astronomical telescope is allowed to rotate around at least two axes respectively in response to the command from the rotation command means, and the star map image displayed in the image display section is transferred in association with the orientation of the telescope. Regarding this stage, the control is given in such a manner that if the display scale factor specified by the scale factor input means is large, the speed of rotation of the astronomical telescope by the rotation command means is lowered, and if the display scale factor specified by the scale factor input means is small, the speed of rotation of the astronomical telescope by the rotation command means is increased. In this way, the present invention allows the rotational speed to be adjusted automatically to match the zooming of the screen and therefore successfully eliminates the need for exclusively changing the rotational speed for each zooming operation.

Preferably, the input operation section is further provided with a shifting input means for shifting between the telescope control mode and the celestial object selection mode for selecting the target celestial object. This allows the mode change to be executed by one step of operation. It may be further contemplated that in the celestial object selection mode, the target celestial object can be made selectable by introduction of the target celestial object into the star map image displayed in the image display section, and also that the star map image displayed in the image display section can be made scrollable by the operation of the rotation command means. This makes the setting of the target celestial object easier. Once the target celestial object has been selected in the celestial object selection mode, the automatic introduction of the target celestial object may be carried out by the operation of the shifting input means, and then the process may proceed to the telescope control mode.

In another preferred aspect of the present invention, provided is a celestial object image display device comprising an image display section for indicating a star map image, the device being characterized in comprising: an azimuth detection means for detecting an azimuth along a direction to which the celestial object image display device is oriented; and a gradient detection means for detecting a gradient along a direction to which the celestial object image display device is oriented, in which the image display section displays the star map image for a specific area which can be observed along the direction specified by the azimuth detected by said azimuth detection means and the gradient detected by said gradient detection means at a current date and time and a longitude and latitude of an observation site. According to this aspect, the constellation and the like can be displayed simply by directing the celestial object image display device held by the user in his/her hand toward the sky. Preferably, the celestial object image display device causes the displayed star map image to make a diurnal motion over time. More preferably, the celestial object image display device may be configured to be connectable as a terminal device of the automatic introduction apparatus for automatically introducing a target celestial object by controlling a rotation of an astronomical telescope around at least two axes. For example, such a terminal device that allows the selection of the target celestial object, the selection of the fundamental star and the like to be performed on the display screen, while cross-referring to the actual sky, if realized, could be a user-friendly terminal device. Further, if it is made possible to control the astronomical telescope connected to the celestial object image display device so as to be oriented toward a direction specified by the azimuth detected by the azimuth detection means and by the gradient detected by the gradient detection means, the control of the telescope will be much easier.

In still another preferred aspect of the present invention, provided is an automatic introduction apparatus for automatically introducing a target celestial object by controlling a rotation of an astronomical telescope around at least two axes, the apparatus being characterized in comprising a Web server function. In this regard, the electric communication means may be selected from a group consisting of the Internet, an intranet and a LAN.

The automatic introduction apparatus with such a Web server function may be controlled by a terminal device equipped with a Web browser function. Owing to this configuration, it becomes possible to use, for example, a dedicated terminal, a commercially available PDA, a mobile phone, a portable game device and a personal computer, meaning that if the user already owns a terminal, purchasing a new terminal is not necessary, or even in case of purchasing a new terminal, the user has more choice when selecting the terminal, satisfying his/her taste.

A terminal device equipped with a Web browser function may use a wireless communication by means of Bluetooth, a wireless LAN, a light, an infrared ray or the like to communicate with the automatic introduction apparatus equipped with the Web server function. This helps eliminate problems associated with cable communication, including signal deterioration, mechanical failure and complicated handling procedures, and thus provides a satisfactory operational environment even for night use.

Further, when a terminal device and an automatic introduction apparatus equipped with a Web server function are interconnected by means of an electric communication means such as the Internet, many forms of control may be employed including: control by a single terminal device for a plurality of automatic introduction apparatuses (1:n control); control by a plurality of terminal devices for a single automatic introduction apparatus (n:1 control); and control by a plurality of terminal devices for a plurality of automatic introduction apparatuses (n:m control). These variations over the form of control can extend the freedom of control significantly as compared to the prior art that has only provided a form of control by each single controller terminal for each single automatic introduction apparatus (1:1 control). For example, a terminal device equipped with an input function and a terminal device equipped with a screen display function can be interconnected to an automatic introduction apparatus via the electric communication means. In this case, the automatic introduction apparatus can execute the control based on information input from the terminal device equipped with the input function, while at the same time controlling the terminal device equipped with the screen display function to display input/output information in association with this control. This can facilitate a smaller-sized handy input terminal and a larger-sized eye-friendly display terminal, thus allowing an effective observation environment, including giving an introductory presentation on respective celestial objects to a large number of people on such an occasion like an astronomical observation and viewing session. Further, a control system for an astronomical telescope can be constructed that enables serial tracking observation of a celestial object by means of a plurality of astronomical telescopes by providing a sequentially shifting control to a plurality of automatic introduction apparatuses.

A control system for an astronomical telescope according to another aspect of the present invention comprises: a controller having a function as a Web server computer; and a plurality of automatic introduction apparatuses, each capable of controlling a rotation of its corresponding astronomical telescope to automatically introduce a target celestial object, said controller and said plurality of automatic introduction apparatuses being interconnected with each other via an electric communication means, in which each of the plurality of automatic introduction apparatuses transmits a set of observation information concerning the apparatus and the controller executes a predetermined service to the plurality of automatic introduction apparatuses based on each received set of observation information.

In another preferred aspect of the present invention, provided is an automatic introduction apparatus for automatically introducing a target celestial object by controlling a rotation of an astronomical telescope around at least two axes, the apparatus being characterized in comprising: an image-capturing means for capturing an image of celestial object; a celestial object database; and a celestial object identification means for identifying a celestial object whose image has been captured, by comparing the image of celestial object captured by the image-capturing means with a set of celestial object information in the celestial object database. In order to reduce a volume of operation to be required, preferably the apparatus further comprises an image processing means for extracting the information of each celestial object from the image of the celestial object captured by the image-capturing means, wherein the celestial object identification means identifies the celestial object whose image has been captured, by comparing the information of each celestial object extracted by the image processing means with the celestial object information stored in the celestial object database.

According to the above-described aspect for the fully automated introduction apparatus, an alignment process for the purpose of defining a set of coordinate transformation information of a coordinate system in the astronomical telescope relative to a celestial coordinate system can be executed automatically based on a set of position information for the celestial object identified by the celestial object identification means. In this case, preferably the image-capturing means is configured such that it can capture images at a plurality of focal distances. The alignment process includes, for example, the steps of: capturing an image of a celestial object under a condition where the image-capturing means has been set at a focal distance for a wide angle side; identifying a celestial object in the celestial object image captured at the wide angle side; correcting the coordinate transformation information based on the position information of the identified celestial object; selecting a fundamental celestial object from the celestial object image captured at the wide angle side; controlling a rotation of the astronomical telescope so that the fundamental celestial object can be introduced into a center of field in the captured image; capturing an image of a celestial object under a condition where the image-capturing means has been shifted to a focal distance for a more telescopic side; identifying a celestial object in the celestial object image captured at the more telescopic side; re-correcting the coordinate transformation information based on the set of position information of the identified celestial object; and setting the image-capturing means sequentially at different focal distances for the more telescopic side and repeating the above respective steps until the fundamental celestial object can be introduced into the center of field in the captured image with a sufficient precision. It is to be noted that the alignment process is executed by using at least two fundamental celestial objects.

Thus, in this aspect, it becomes possible to obtain the input information automatically, which has previously relied on a manual input operation from the user. Further, the alignment precision can be significantly improved over the automatic alignment obtained by using the GPS, a horizontal sensor and a magnetic sensor, because in this aspect the alignment is provided based on the position of the image-captured celestial object.

A fully automated introduction apparatus also provides for an automated execution of the correction for the target celestial object after the automatic introduction so that it can be introduced into the center of the field. In this case, the procedure is such that after the automatic introduction of the target celestial object, the celestial object image is captured by the image-capturing means, the celestial object in the captured image of the celestial object is identified, and based on the position information of the identified celestial object, the rotational control of the astronomical telescope is provided so as to introduce the target celestial object into the center of the field. In this case, preferably the image-capturing means is configured so that it can capture images at a plurality of focal distances. The fully automated introduction is achieved by executing the step of: after introducing the target celestial object automatically, capturing a celestial object image under a condition where the image-capturing means has been set at a predetermined focal distance; identifying a celestial object from the captured image of the celestial object; controlling the astronomical telescope to rotate so that the target celestial object can be introduced into the center of field in the captured image based on the position information for the identified celestial object; and setting the image-capturing means sequentially at different focal distances for the more telescopic side and repeating the above respective steps until the target celestial object can be introduced into the center of the field in the captured image with a sufficient precision.

These and other features of the present invention will be more apparent from reading of the following detailed description with reference to the attached drawings.

BRIEF DESCRIPTION OF THE DRAWINGS

FIG. 7 is a schematic diagram illustrating a Web server type automatic introduction apparatus along with a Web browser type terminal device according to a second embodiment of the present invention;

FIG. 9 shows a form of connection between the terminal device and the Web server type automatic introduction apparatus according to the third embodiment of the present invention, taking advantage of the Internet connection as shown in FIG. 8, illustrating various types of control as shown in the diagrams: A (1:1 control), B (1:n control), C (n:1 control) and D (n:m control);

DESCRIPTION OF THE PREFERRED EMBODIMENTS

Preferred embodiments of the present invention will now be described with reference to the attached drawings.

First Embodiment

Figure 1:
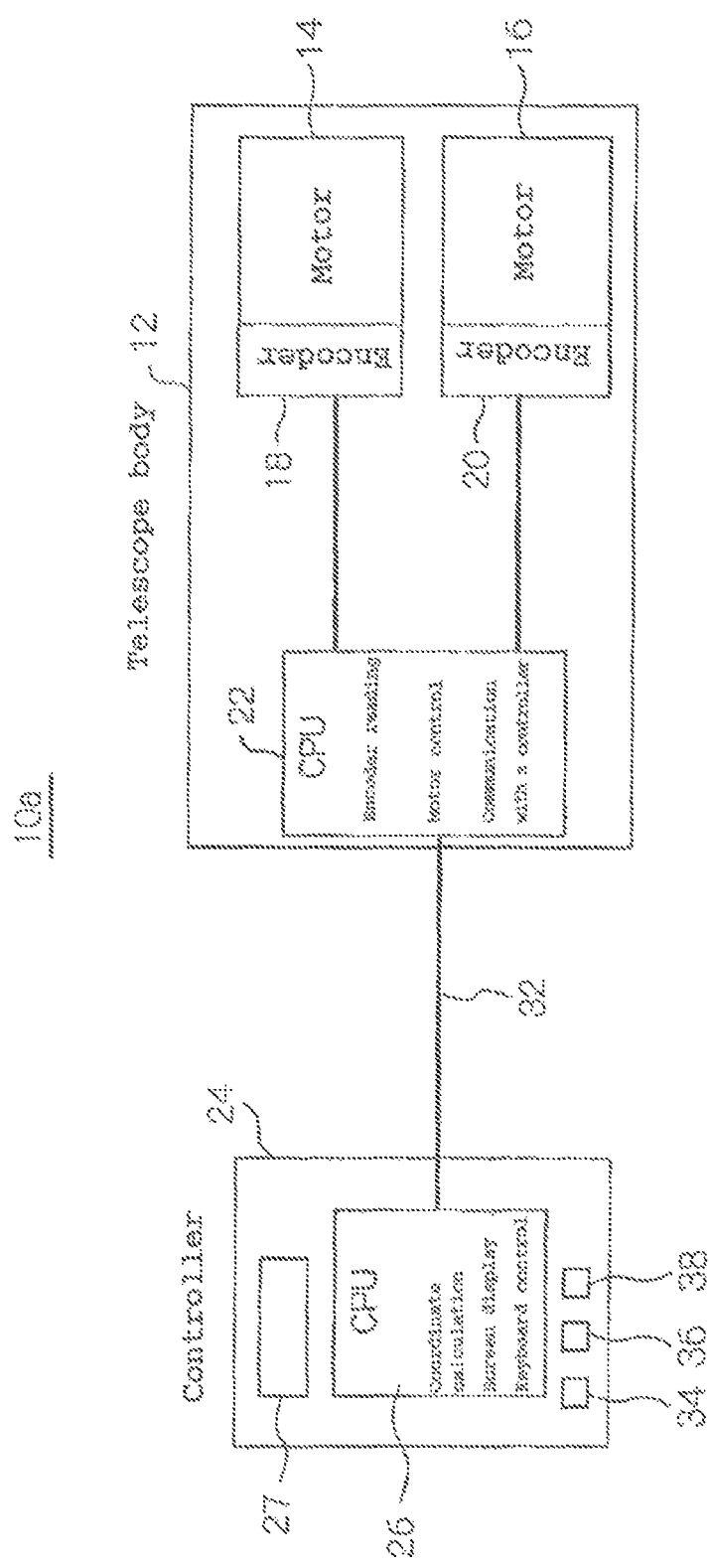
FIG. 1 is a schematic diagram illustrating an automatic introduction apparatus comprising a handy planetarium type handset according to a first embodiment of the present invention.

An Automatic Introduction Apparatus Equipped with a Handy Planetarium Type Handset FIG. 1 shows a schematic block diagram of an automatic introduction type astronomical telescope comprising an astronomical object automatic introduction apparatus 10a according to a first embodiment of the present invention.

A telescope body 12 is of a type having two rotation axes in orthogonal relationship, comprising motors 14, 16 mounted respectively to each of the orthogonal rotation axes to rotate the astronomical telescope body 12 around each of the axes and encoders 18, 20 connected respectively to each of the motor shafts for outputting a pulse signal in response to the revolution of the motors 14, 16. It is to be noted that the encoders 18, 20 are not limited to be directly connected to the motor shaft but may be disposed in an intermediate stage in the course of deceleration to the ultimate stage along each one of right ascension and declination (or horizontal and vertical) axes by a set of gears, or may be directly coupled to each one of the right ascension and the declination axes.

The telescope body 12 further comprises a CPU 22 for controlling the telescope to cause it to carry out a function of the automatic introduction apparatus 10a. The CPU 22 is connected to the encoders 18, 20 so as to read and count signal output from the encoders 18, 20 and also to provide rotational control of the motors 14, 16 in accordance with an input command from outside. The CPU is connected to a handheld type controller (handset) 24 allowing for an input operation by a user via a cable 32.

The handset 24 is incorporated with a CPU 26 and the CPU 26 is operable to detect a current position on a celestial sphere, to which the telescope is oriented, from the count value of the encoder signal sent from the CPU 22, and then to send a command to the CPU 22 so that said position can fall on a coordinate position of the target celestial object input by the user. The CPU 26 further provides a screen display and a keyboard control, as will be described later in detail.

Further, the handset 24 comprises a star map database 27 in which all types of celestial data used in the star map have been stored, an azimuth sensor 34 for detecting an azimuth along which the handset 24 is oriented, a gradient sensor 36 for detecting an inclination angle of the handset 24 and an internal clock 38. These components are connected to the CPU 26 via a bus, which is not shown.

It is to be noted that the handset 24 and the CPU 22 may be fabricated integrally in one unit. Specifically, such a configuration can be contemplated that the CPU 26 includes the function of the CPU 22 or that both of the CPU 26 and the CPU 22 are disposed in the handset 24. Alternatively, the telescope body may be incorporated with the function of the handset 24 and the telescope body may be equipped with a screen display section and/or a keyboard for the input operation.

Figure 2:
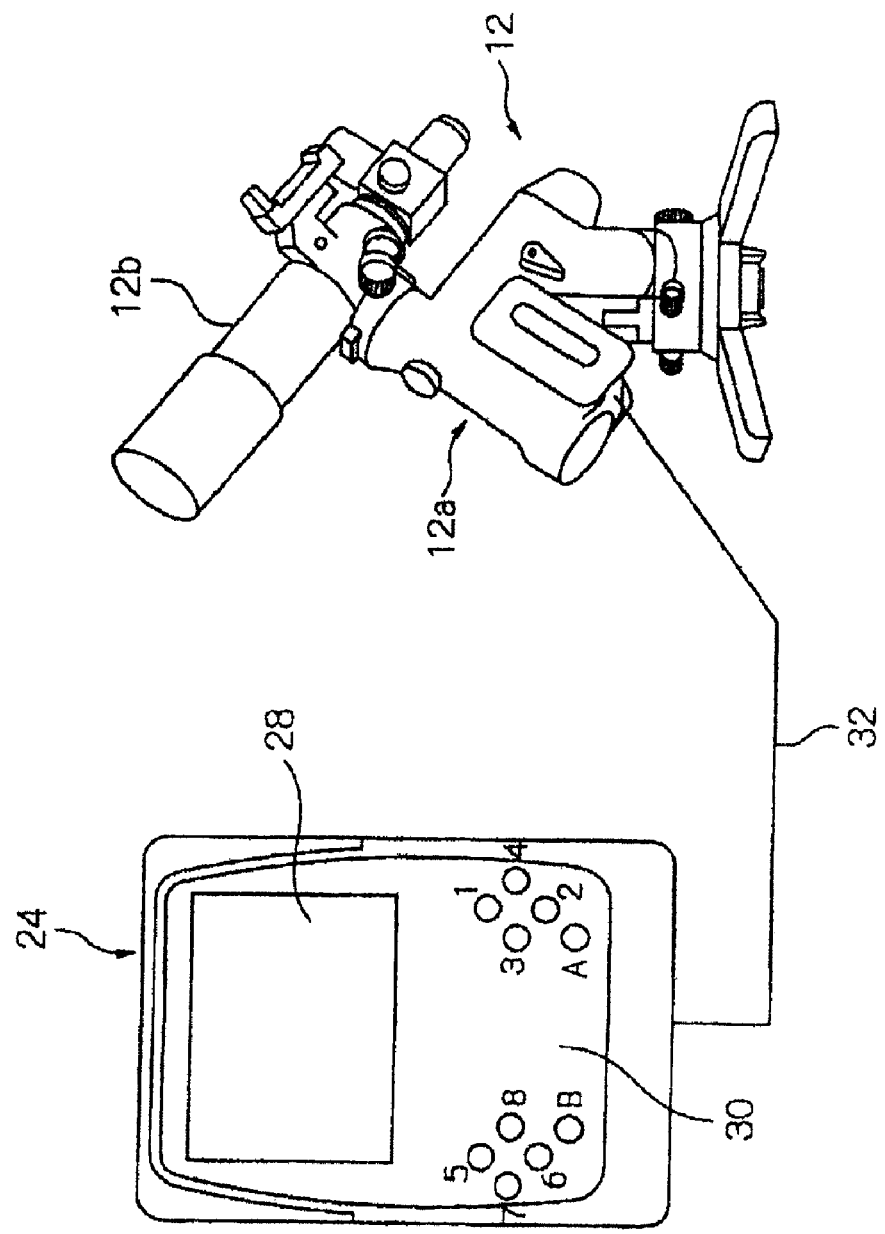
FIG. 2 is an external view of the handset and telescope main body of FIG. 1.

FIG. 2 shows an exterior view of the telescope body 12 and the handset 24. The telescope body 12 comprises a mount 12a and a telescope lens barrel 12b mounted on the mount 12a. In the example of FIG. 2, an equatorial mounting has been employed as the mounting 12a and the motors 14 and 16 are serving as a right ascension motor and a declination motor, respectively. It is to be appreciated that although the right ascension motor 14 and the declination motor 16 are mounted internally in a right ascension housing and a declination housing of the mount 12a, they may be of the external type. Further, the CPU 22 may be accommodated in a control substrate contained in the declination housing, for example, or the controller incorporated with the CPU 22 may be connected externally to the mount 12a. The automatic introduction apparatus 10a of the illustrated embodiment is applicable to an altazimuth mounting and in that case the motors 14 and 16 serve as a horizontal motor and an altitude motor, respectively.

The handset 24 shown in FIG. 2 comprises a graphical display section 28 and an input operation section 30 including a plurality of keys or buttons (A, B, 1, 2, 3, 4, 5, 6, 7 and 8).

Figure 3A:
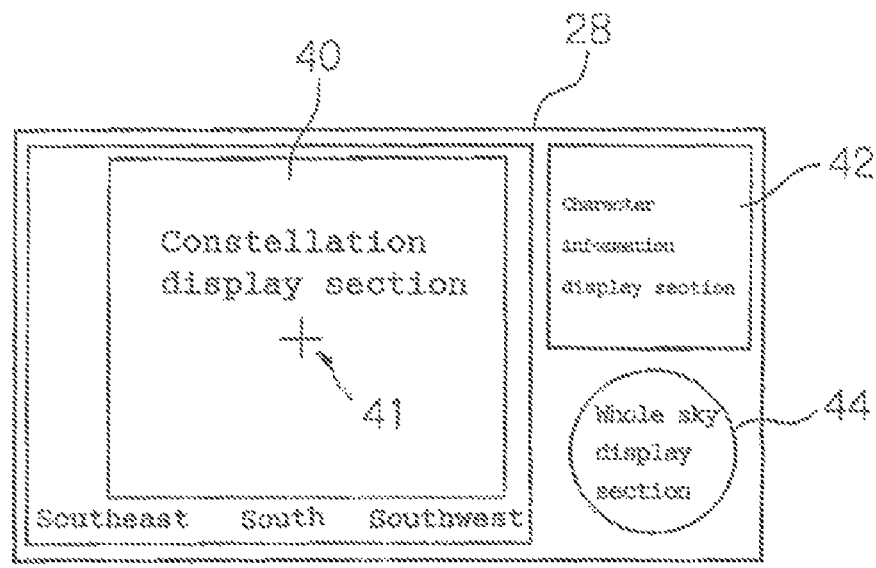
FIG. 3A shows an example of a configuration for a graphic display section of the handset depicted in FIG. 2.

The graphical display section 28 is provided with a star map display section 40 capable of displaying a star map image consisting of, for example, an arrangement of fixed stars, planets, cluster of nebulas and constellations, a whole sky display section 44 capable of displaying a wider celestial sphere area than the star map display section 40, for example, a star map image for the north hemisphere or the south hemisphere and a character display section 42 for indicating the information relating to the telescope body 12 and the celestial object by using the characters as shown in FIG. 3A.

The star map display section 40 presents an azimuth along the horizontal axis and an altitude along the vertical axis. The CPU 26 reads the image data from the star map database 27 in accordance with a predetermined algorithm based on a set of input information input from the input operation section 30 and a set of output information from various types of sensors, which are in turn displayed in the star map display section 40. In this regard, names of constellations, planets and the like displayed in the star map image may be presented.

Figure 3B:
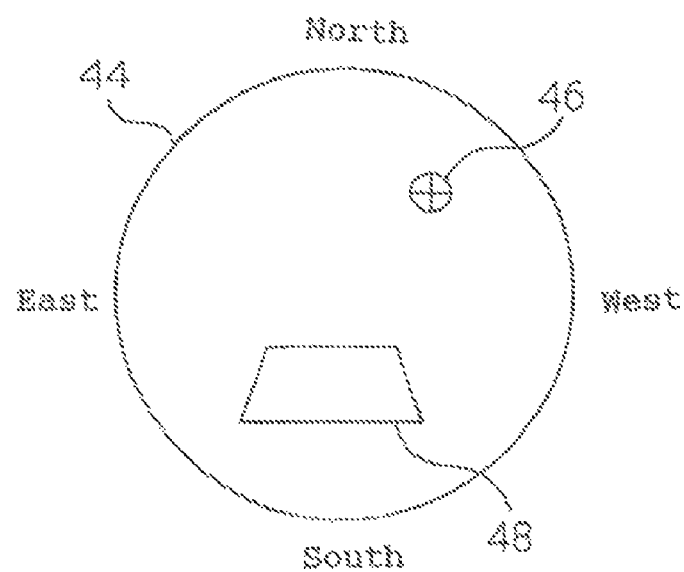
FIG. 3B is an enlarged view of a whole sky display area of said graphic display section.

Further, the CPU 26 provides an indication in the form of cursor 46 as shown in FIG. 3B representing the current coordinate position on the celestial sphere to which the telescope is oriented, which has been detected from the count value of the encoder signal, or the coordinate position of the target celestial object. The CPU 26 further presents, in the whole sky display section 44, a frame 48 representing a range displayed in the star map display section 40. This helps the user to know instantly to which azimuth the telescope is oriented and/or which area on the whole sky the star map display section corresponds, thus facilitating an understanding of the whole image.

A handling procedure and a control method of the automatic introduction apparatus 10a according to the illustrated embodiment will now be described.

This automatic introduction apparatus 10a includes at least two different modes: a celestial object selecting mode for selecting the target celestial object over the screen; and a telescope control mode, in which pressing down the button moves the telescope (mount).

Figure 4A:
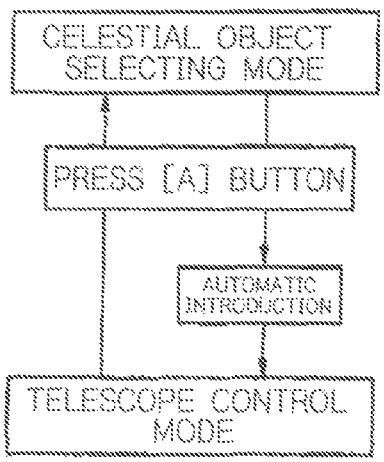
FIG. 4A is a block diagram showing a procedure for shifting between a celestial object selecting mode and a telescope control mode in the handset according to the first embodiment.

It is assumed by way of example that the celestial object selecting mode is active, when the system is activated, as shown in FIG. 4A.

If the user presses down one of the buttons, 1, 2, 3 and 4 (see FIG. 2) of the input operation section 30, a sky presented in the star map display section 40 (see FIG. 3A) is moved vertically and horizontally in accordance with the moving directions assigned to respective buttons. It is to be noted that the mount of the telescope is not moving during this operation. The user manipulates the buttons so as to bring the target celestial object desired to be introduced to the position of the cursor 41 located in the center of the star map display section 40, while viewing the presented sky image. Once the target celestial object is displayed in the center, the character information display section 42 may present various types of description including a right ascension value, a declination value, a type of celestial object, a magnitude and a distance from the earth (in light years).

Under a condition where the target celestial object is displayed in the center of field, pressing down the A button shifts the screen into the telescope control mode, where the telescope is placed under a motor control so as to be moved toward the target celestial object. Since the actual coordinate position to which the telescope is oriented is indicated by the cursor 46 of the whole sky display section 44, the user can intuitively realize an elongation between the target celestial object displayed in the center of the star map display section 40 and the current position of the telescope. As the cursor 46 moves in conjunction with the shifting of the telescope orientation and ultimately enters the frame 48 representing the area occupied by the star map display section 40 presented in the whole sky display section 40, the cursor 46 also appears in the star map display section 40. At the completion of the introduction, the cursor 41 located in the center of the screen meets the cursor 46, which indicates a match in orientation between the target celestial object and the telescope. Subsequently, if one of the buttons 1, 2, 3 or 4 is pressed down, the orientation of the telescope is shifted and, associatively, the screen in the star map display section 40 is shifted.

In the telescope control mode, the center region of the screen in the star map display section 40 may be used to constantly present the coordinate to which the telescope is oriented. In such a case, if the button A is pressed down under a condition where the target celestial object is displayed in the center of the screen in the celestial object selection mode, the screen display of the star map display section 40 is changed from the state presenting the target celestial object located in the center to the state presenting the telescope oriented coordinate located in the center of screen, and the screen in the star map display section 40 is moved in association with the commencement of the automatic introduction. In this stage, the cursor 46 represents the position of the target celestial object, and preferably the design of the cursor 46 should be modified in order to be distinguishable from the cursor in the case described above.

Further, the cursor 41 located in the center of the screen in the star map display section 40 may be used to constantly represent the telescope oriented coordinate position both in the celestial object selecting mode and in the telescope control mode. In such a case, the target celestial object may be specified by the position of the cursor 46 in the celestial object selecting mode, in which the buttons 1, 2, 3 and 4 may be used to shift the cursor position.

As is shown in FIG. 4A, after the completion of the automatic introduction, pressing down the button [A] again switches the screen into the celestial object selecting mode. Thus, a single clicking operation can provide the switching operation between the celestial object selecting mode and the telescope control mode, wherein, upon switching from [the celestial object selecting mode] to [the telescope control mode], the automatic introduction is simultaneously started. In order to give a clear indication of the system having been shifted to the respective mode, it is preferred to present the character indication of the current mode on the screen, to modify the design of the cursor located in the center of screen and/or to modify the screen background color.

Thus, in the illustrated embodiment allowing the handset 24 to provide not only the character indication of the information but also the display of the star map, the user can select the target celestial object more easily.

It is to be noted that, if it is desired to specify a relatively larger area, such as west sky or east sky, preferably an extensive area display should also be provided on the screen. Further, if it is desired to point out a target celestial object from among a dense collection of celestial objects, preferably an enlarged indication should be given. To satisfy such a demand, the button 5 may be assigned a zooming in function and the button 6 a zooming out function, in the input operation section 30 of the handset 24. It may be arranged such that each pressing of respective buttons can effect the enlargement or reduction in accordance with predetermined enlarging or reducing scale factors.

It is assumed herein that the current mode is set in the telescope control mode. When the screen has been set with a high enlarging scale factor, the whole screen can only present an indication of a very small area. Under this condition, if the motor speed is set high, pressing down the motor control button 1, 2, 3 or 4 causes the movement to take effect over a large area rapidly, resulting in the indication of a quite different location on the screen, which makes it difficult to grasp the current position. Now, the opposite state is assumed, in which the large area display is presented over the entire screen. Under this condition, if the motor speed is set low, pressing down the button 1, 2, 3 or 4 would cause the telescope to move over an extremely small area, which would be occasionally smaller than one pixel size on the screen. In such a case, a screen that is capable of showing a representation of the movement of the telescope (field of view) is not practically affordable. Accordingly, it is desirable that the control be provided automatically such that the motor speed can be set low when the screen is in the enlarged state and the motor speed can be set high when the screen is not in the enlarged state.

Figure 4B:
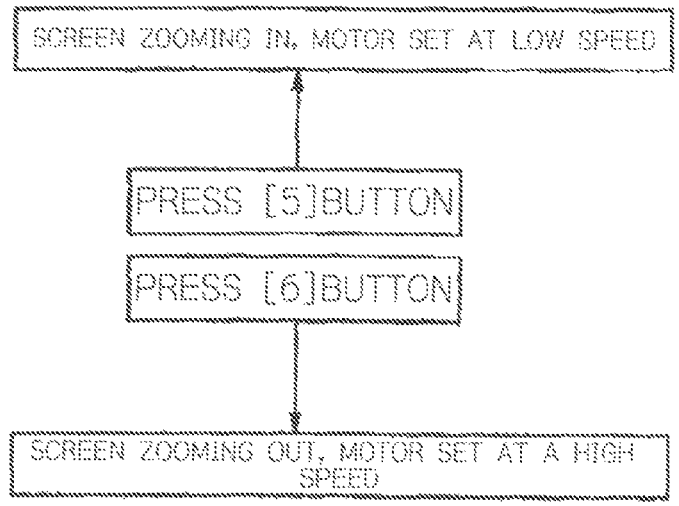
FIG. 4B is a block diagram showing an associative operation between a zooming function and a motor speed setting.

In the illustrated embodiment, such an arrangement as shown in FIG. 4B has been provided, in which each pressing of the zoom-in button 5 can slow down the motor speed and conversely each pressing of the zoom-out button 6 can increase the motor speed.

Since the present invention allows the motor speed to be changed automatically in accordance the zooming operation of the screen, a problem that the motor speed has to be exclusively changed in association with each zooming operation can be eliminated.

The handset 24 according to the illustrated embodiment further comprises an electronic constellation quick reference mode for guiding a user about a sky. A procedure in this mode is shown in the flow chart of FIG. 5.

Figure 5:
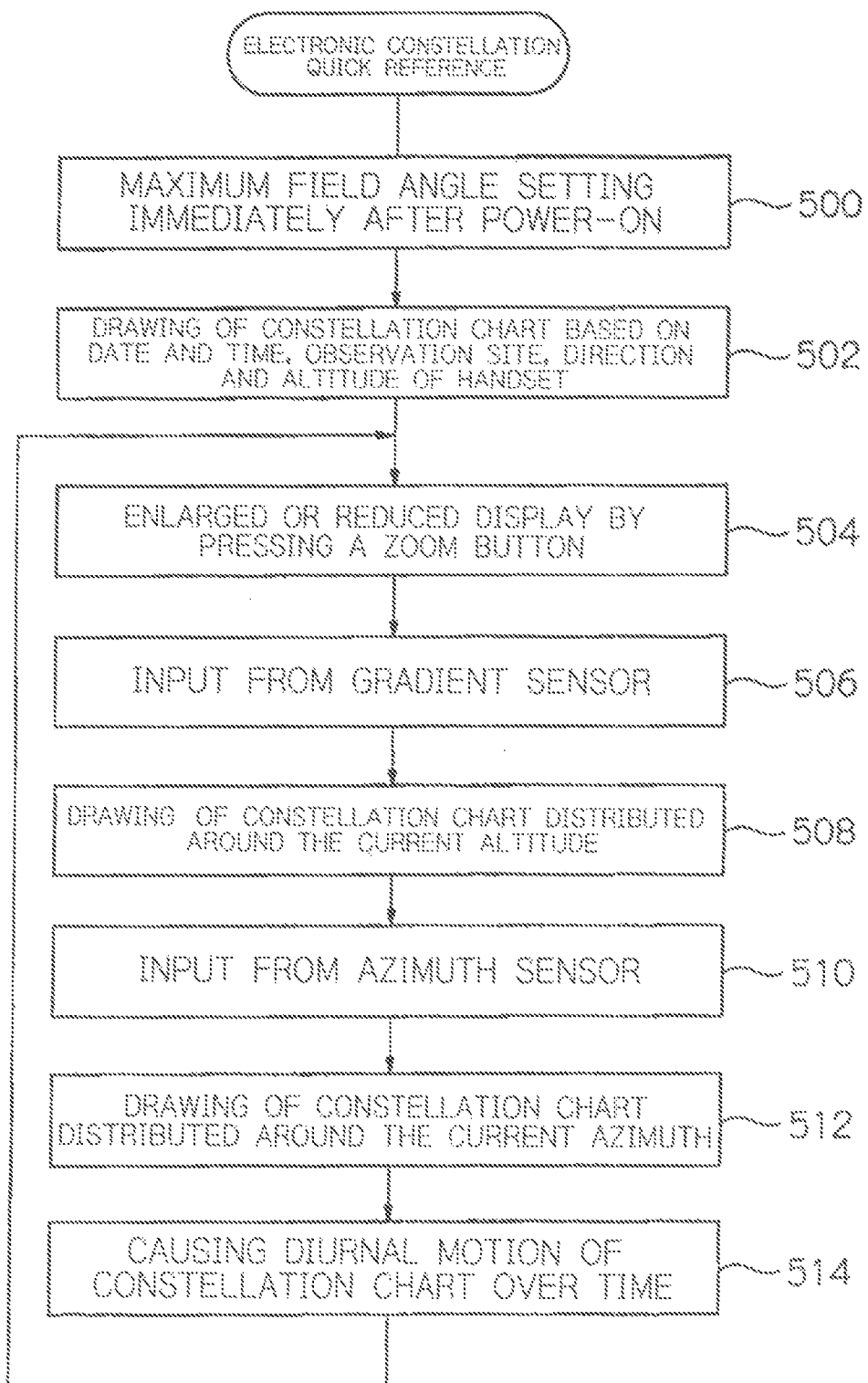
FIG. 5 is a flow chart showing a flow of processing in an electronic constellation quick reference mode of the handset according to the first embodiment.

As shown in FIG. 5, immediately after the handset 24 has been powered on, the star map display section 40 is in the setting for a maximum field angle display (Step 500).

Figure 6A:
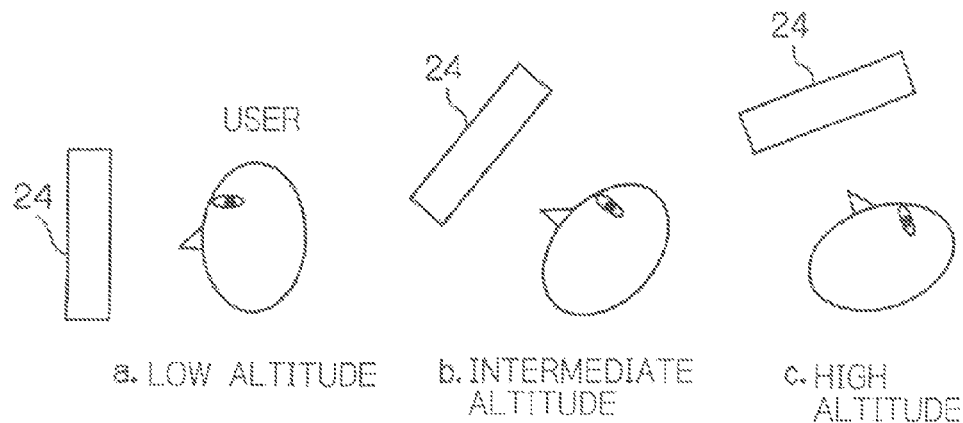
FIG. 6A is a set of sketches showing a user holding the handset set in the electronic constellation quick reference mode of FIG. 5 at each different tilting angle (altitude)

In this state, the user directs the handset 24 toward the sky desired to be observed as shown in FIG. 6A. It can be seen from the illustration that the altitude is classified as a low altitude, an intermediate altitude or a high altitude depending on the azimuth of the sky desired to be observed.

Then, the handset 24 provides the drawing of a constellation chart in the star map display section 40, which is associated with the corresponding date and time, observation site, orientation in the handset 24 and altitude (Step 502 of FIG. 5).

Figure 6B:
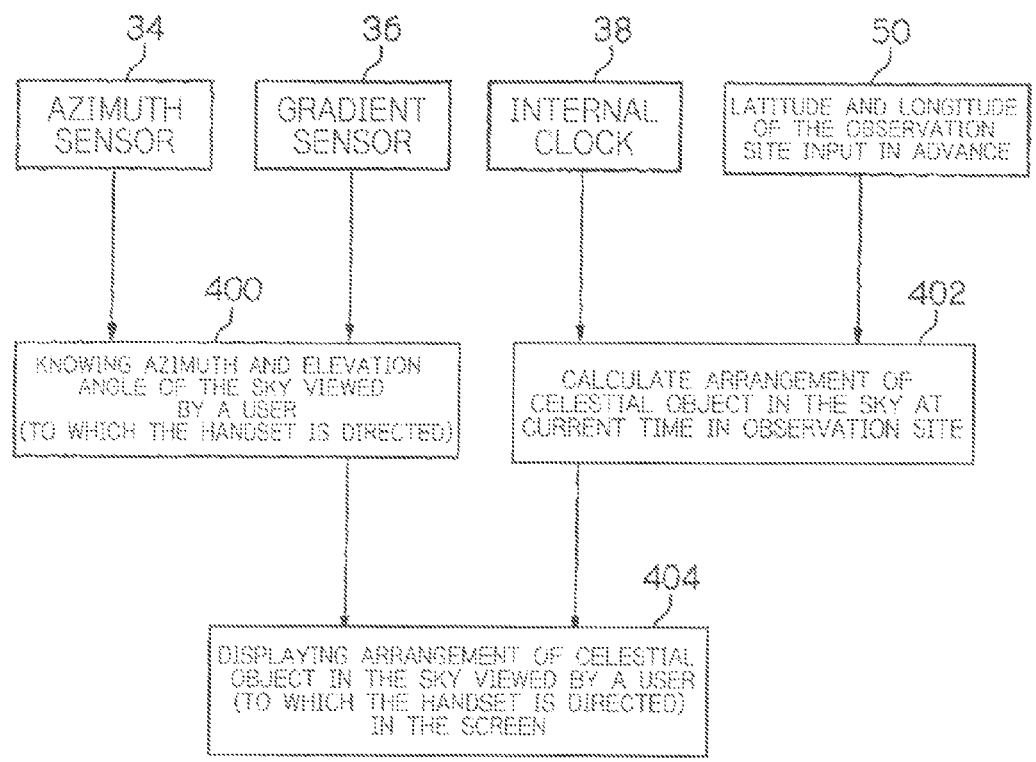
FIG. 6B is a block diagram showing a set of processes executed by the handset in the state of FIG. 6A.

A drawing control of Step 502 may be provided such as shown in FIG. 6. Specifically, the CPU 26 of the handset 24 executes an arithmetic operation to determine an azimuth and an elevation angle (altitude) for the sky in the view of the user (i.e., the sky to which the handset 24 is oriented) based on the signals output from the azimuth sensor 34 and the gradient sensor 36 (Step 400). In parallel with or prior to this operation, the CPU 26 computes to determine an astronomical configuration in the sky at the present time in the observation site based on the internal clock 38 and the latitude and longitude 50 of said observation site that has been previously input and stored in a flash memory, for example (Step 402). It is to be noted that, although the latitude and longitude information 50 of the observation site may be input by the user from the input operation section 30, it may be detected automatically via a GPS.

Subsequently, the CPU 26 reads a set of image data from the star map database 27 based on the derived astronomical configuration at the present time in the observation site, the set of image data corresponding to the area defined by the current scale factor available for the display in the star map display section 40 of the handset 24, and then the CPU 26 compiles the data and presents the image of the constellation in the current view of the user (i.e., the constellation to which the handset 24 is oriented) to be displayed in the star map display section 40 (Step 404). In this way, the user can easily obtain knowledge on the astronomical configuration in the sky by the maximum field angle in the star map display section 40.

Then, the CPU 26 is transferred to the zooming waiting mode (Step 504). During this mode, if the user desires to know the displayed celestial object in more detail, the user can press the zoom-in button 5 to thereby display an enlarge image. If the user desires a larger area to be displayed, the zoom-out button 6 may be pressed to display a reduced image. It is to be noted that since not only the image but also the names of the celestial objects as well as the constellations are presented in the star map display section 40, the user can obtain an instant knowledge of the names of the celestial objects and constellations currently shown in the image. If necessary, it is also contemplated that the character information display section 42 presents a detailed description on the celestial object or constellation pointed to by the cursor 41.

Additionally, the CPU 26 constantly monitors the output signals from the azimuth sensor 34 and the gradient sensor 36, as will be described below.

If there is a significant variation in the input from the gradient sensor 36 (Step 506 of FIG. 5), the CPU 26 causes the star map display section 40 to redraw the constellation chart allocated around the detected inclination (altitude) of the handset 24 (Step 508). If there is a significant variation in the input from the azimuth sensor 34 (Step 510), the CPU 26 causes the star map display section 40 to redraw the constellation chart allocated around the detected azimuth of the handset 24 (Step 512). This allows the user to know the actually emerging constellations and/or celestial objects immediately only by directing the handset 24 toward any direction in the sky to be observed. In this regard, if the displayed image is modified in tracing of a minute variation in gradient or azimuth, it may be of poor quality, and so it is preferable that the modification to the image be applied when the variation range exceeds a predetermined value and after that state has lasted for a predetermined time period. Further, when the handset 24 is moved, preferably the display should not fully follow the moving speed of the handset 24 but the moving speed over the displayed image should be appropriately set by taking the visibility into account.

It is to be noted that a fixed display mode may be provided, in which the once-displayed astronomical configuration image is fixedly presented by a button manipulation so that the same image can be displayed continuously, even if the position of the handset 24 has been changed. If the fixed display mode is released by the button manipulation, the CPU 26 can be immediately transferred to the above-described monitoring mode.

Further, the CPU 26 at the same time provides a control to cause the displayed constellation chart to make a diurnal motion over time (Step 514). The control can be provided similarly in the above-described fixed display mode, as well. Then, the CPU 26 is transferred again into the zooming waiting mode, where similar processes can be repeated.

This electronic constellation quick reference mode may be used to select a fundamental star used in the alignment before the automatic introduction. For example, the star registered as one of the fundamental stars may be displayed with a mark attached thereto. When the user presses the selection button with the displayed fundamental star placed over the central cursor 41 in the star map display section 40 or the cursor 46, the CPU 26 can detect which fundamental star has been selected. Further, the CPU 26 determines which direction the selected fundamental star is currently oriented to and stores it. During the alignment process, the CPU 26 controls the motor so that the telescope is oriented automatically to the direction of the selected fundamental star. In this case, due to a sensor error, occasionally the fundamental star fails to fall in the center of the field of view of the telescope. On such an occasion, the user presses the buttons 1, 2, 3 or 4 in the input operation section 30 to thereby place the fundamental star ultimately in the center of field and thus notify the accurate position of the fundamental star to the CPU 26. It is to be noted that if there is a time difference between the selection time of the fundamental star and the alignment time, the position of the fundamental star in storage varies due to the diurnal motion, and so it is preferable that the stored position should be renewed in association with the diurnal motion.

Although this mode requires that the user has to finally make an alignment operation, the mode allows the user to intuitively select the fundamental star simply by orienting the handset 24 to the region of the sky containing the star emerging therein, and also allows the fundamental star to be introduced into an appropriate position, and so the burden on the user required in performing the alignment operation can be reduced considerably over the conventional method in which the fundamental stars are selected one by one on the character display and then the telescope is moved from its initial orientation to the position of the fundamental star by manipulation using the buttons of the handset.

The electronic constellation quick reference mode may be used to select the target celestial object in the above-described celestial object selecting mode. In this case, the user can select the target celestial object by placing it over the cursor 41 or 46, while comparing the displayed image with the actual constellation. It is further contemplated that the electronic constellation quick reference mode may be made usable in association with the above-described telescope control mode. In such a case, the telescope is controlled to be driven so that the orientation of the handset 24 may be aligned with the field of view of the telescope.

As is described above, the illustrated embodiment provides a user-friendly system allowing the user to perform the information collection and/or the selection of respective constellations or celestial objects intuitively, while cross referring to the actual sky.

Second Embodiment

A Web Server Type Automatic Introduction Apparatus

FIG. 7 shows a schematic configuration of a Web server type automatic introduction apparatus 10*b* according to a second embodiment of the present invention. It is to be noted that features similar to those in the first embodiment are designated with like reference numerals, and detailed descriptions of similar features are herein omitted, a description being given only of different features.

The astronomical telescope body 12 comprises a CPU 52 for achieving a function of an automatic introduction apparatus 10*b*. The CPU 52 is provided not only with a function for executing a calculation of coordinates, a reading of signals from the encoders 18 and 20, a motor control and a communication with the controller terminals but also another function for serving as a server computer capable of accessing the Internet for communication with a variety of terminals so as to control the telescope body 12.

Thus, in the second embodiment, since the automatic introduction apparatus 10*b* is configured to be equipped with a Web server function, it has become possible to use a terminal loaded with a Web browser function in order to control the automatic introduction apparatus 10*b*. Owing to this, a controller 54 of the automatic introduction apparatus 10*b* can be configured as any desired type of terminal having the Web browser function, the screen display, the key input control function and the communication function. Such a terminal may be, for example, a dedicated terminal, a commercially available PDA, a cellular telephone, a handheld gaming device or a personal computer. Accordingly, if a user already owns a terminal, purchasing a new terminal is not necessary, or even when purchasing a new terminal, the user has a wider choice, and can select the terminal satisfying his/her taste. It is to be noted that the handset 24 of the first embodiment, which has been additionally provided with the browser function, may be employed as the controller 54. In such a case, if the astronomical information, including a new comet, a nova, for example, obtained from the Internet via the Web server 52 is displayed in the display section 28, a timely observation of a celestial object can be facilitated.

The communication method with the CPU 52 may employ a wireless communication by means of Bluetooth as exemplarily illustrated in FIG. 7, or other types of wireless communication by means of a wireless LAN, a light or an infrared ray, for example. This reduces problems associated with cable communication, including signal deterioration, mechanical failure and complicated handling procedures, and thus provides a satisfactory operational environment for night use. Of course, the present embodiment also allows for Internet communication by using a cable or via a telephone line.

It is to be noted that the telescope body 12 may be incorporated with a function for serving as the handset. Specifically, the telescope body may be equipped with the screen display section or the keyboard for the input operation. Further, a handset incorporated with the Web server function may be also contemplated, including such a configuration of the handset 24 of FIG. 1 that is incorporated with the Web server function, to which the terminal having the Web browser function is connected.

Third Embodiment

A Control System for an Astronomical Telescope

A control system in a third embodiment will now be described, in which one or more terminals and one or more automatic introduction apparatuses are connected in a network. It is to be noted that features similar to those in the first and second embodiments are designated with the same reference numerals, and detailed descriptions of similar features are herein omitted, a description being given only of different features.

Figure 8A:
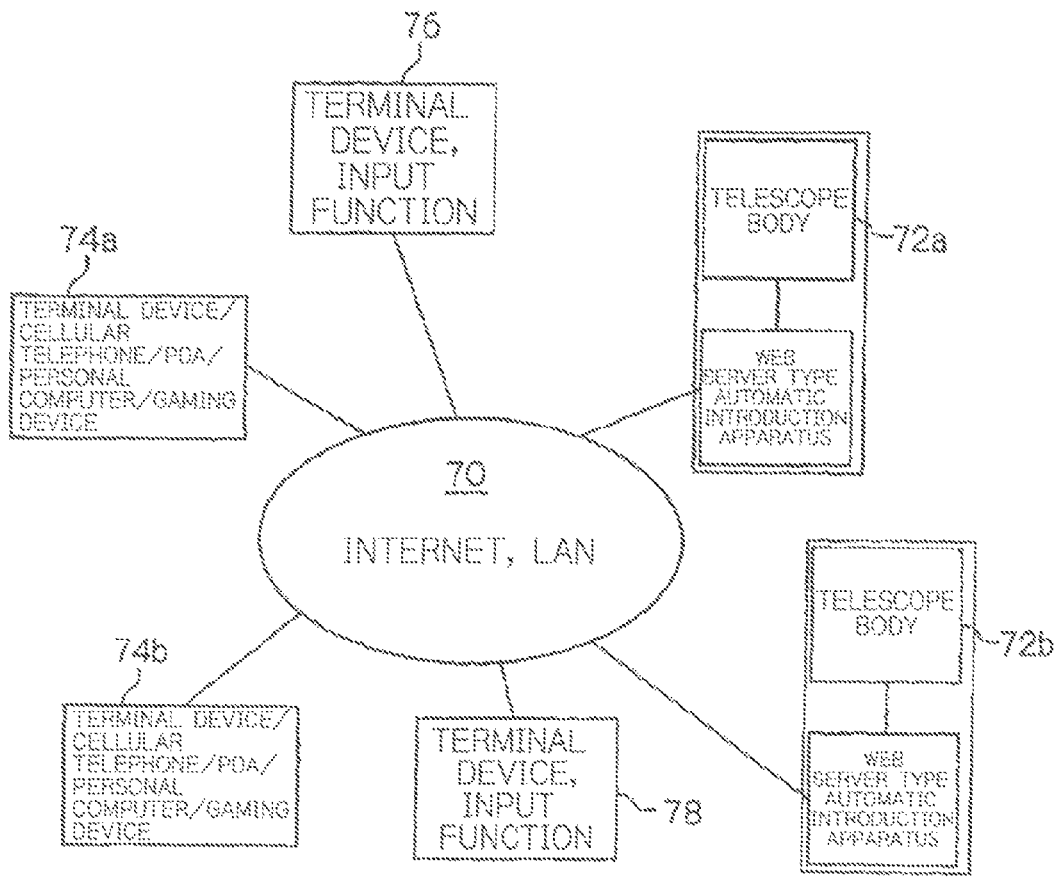
FIG. 8A shows a third embodiment of the present invention representing a state in which the Web server type automatic introduction apparatus and the Web browser type terminal device depicted in FIG. 7 are interconnected via the Internet.

FIG. 8A shows a form of connection among a plurality of automatic introduction apparatuses 72*a*, 72*b*, ..., each having the same function as the automatic introduction apparatus 10*b* of FIG. 7, a plurality of terminal devices 74*a*, 74*b*, ..., each having the same function as the controller 54 of FIG. 7, a terminal device 76 dedicated for the screen display function and a terminal device 78 dedicated for the input function, all of which are interconnected via the Internet 70. It is to be noted that instead of the Internet 70, an intranet or a LAN (wired or wireless) may be used.

As is apparent from FIG. 8A, even when the terminal device 74*a*, 74*b* is located remotely from the location of the automatic introduction apparatus 72*a*, 72*b* (telescope body), the automatic introduction apparatus 72*a*, 72*b* having the Web server function can be controlled by the terminal device 74*a*, 74*b* via the Internet 70. For example, the telescope may be installed on a rooftop and the controller terminal may be placed in a room at a lower level, from which remote control still can be performed. It is further contemplated that the telescope may be installed on a high mountain, and controlled by a controller located in an urban area.

It can be also seen from FIG. 8A that variations of operation, including 1:1, 1:n, n:1 and n:m operations, may be possible by the automatic introduction apparatus main unit that has been provided with the Web server function and the terminal device that has been provided with the Web browser function (see FIG. 9). Specifically, it becomes possible for a single terminal to manipulate a plurality of telescopes, or for a large number of people to manipulate a single telescope or a plurality of telescopes. Advantageously, this helps achieve an efficient observation on such an occasion as an astronomical observation and viewing session.

A control flow in the 1:n, n:1 and n:m connections will now be illustrated (m>1, n>1; m,n: integer).

Figure 10:
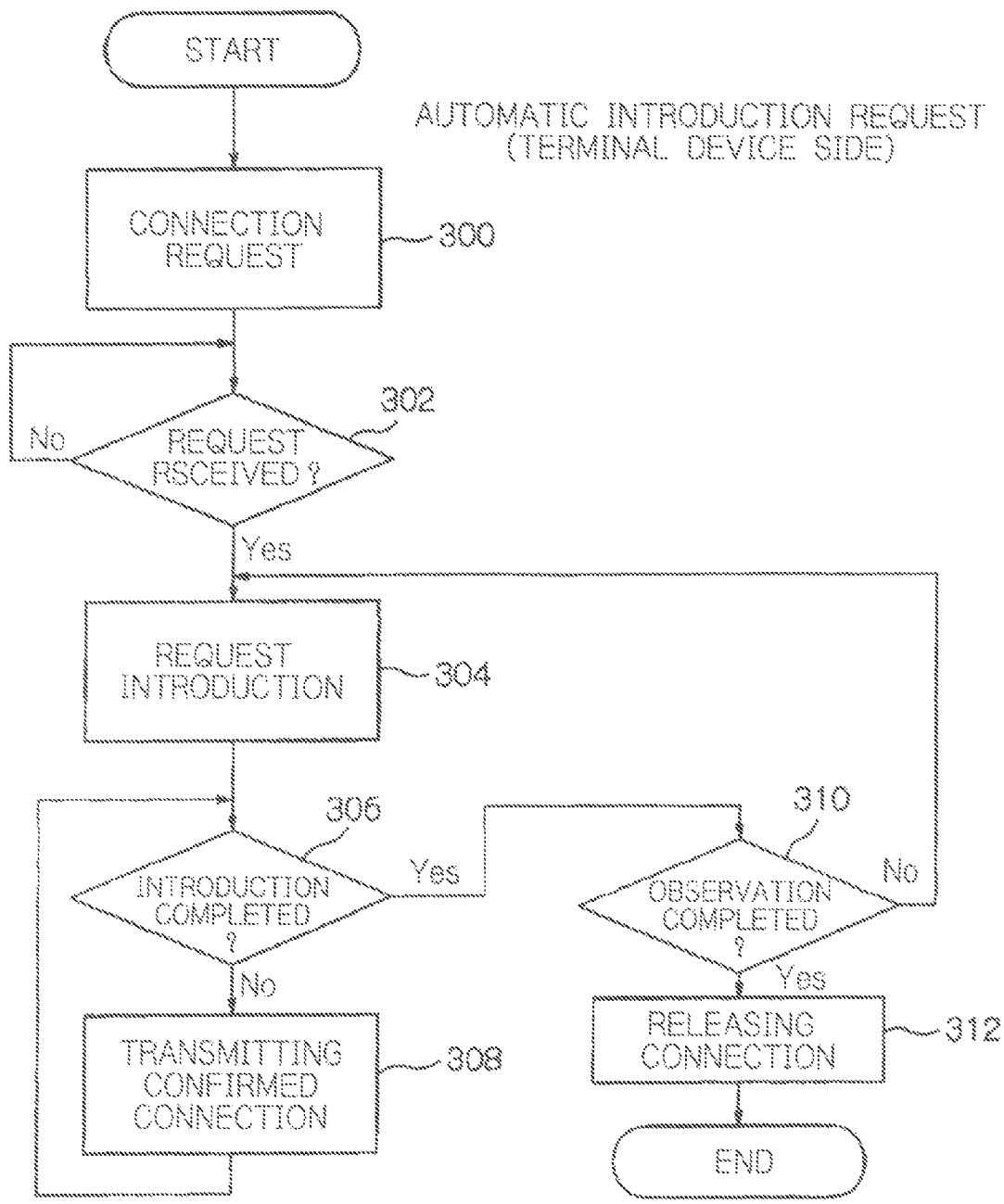
FIG. 10 is a flow chart showing a flow of processing of automatic introduction control executed in the terminal device side in the form of connection shown in FIG. 9.

Firstly, the flow chart of FIG. 10 is used to describe a flow of control executed in the terminal device which is requesting automatic introduction. First, a connection request is transmitted from the terminal device to the automatic introduction apparatus (Step 300). If a plurality of automatic introduction apparatuses are connectable via the Internet, any one of them may be selected or the connection request may be transmitted to some or all of them. Then, the terminal device stands by until it receives a response to the connection request from the automatic introduction apparatus (Step 302). When the terminal device has received the response from the automatic introduction apparatus (Step 302 affirmative determination), an introduction request (request signal for introduction of celestial object) is sent to the same automatic introduction apparatus (Step 304). This request signal for introduction of a celestial object includes, for example, a set of information for specifying a target celestial object or a position on a celestial sphere to be introduced by the automatic introduction apparatus that has transmitted the response (right ascension, declination). If the terminal device is connected to a plurality of automatic introduction apparatuses, a request signal for introduction of a celestial object is sent to the plurality of automatic introduction apparatuses, respectively, in accordance with a predetermined sequence (e.g., the sequence of receipt of responses). The target celestial objects may be different or identical among the plurality of automatic introduction apparatuses.

It is then determined whether the introduction by the automatic introduction apparatus has been completed (Step 306). If the introduction has not yet been completed (Step 306 negative determination), a connection acknowledgment signal is sent (Step 308) and the terminal device stands by until the introduction has been finally completed. If the introduction has been completed (Step 306 affirmative determination), it is determined whether the observation is terminated by the same automatic introduction apparatus (Step 310). This determination of terminating the observation may be made based on, for example, whether the introduction schedule in the terminal device side has been completed or whether the instruction of terminating the observation has been given from the automatic introduction apparatus side. If not terminating the observation (Step 310 negative determination), the process returns to Step 304 where the introduction request is transmitted. If terminating the observation (Step 310 affirmative determination), the connection with the same automatic introduction apparatus is released (Step 312).

Figure 11:
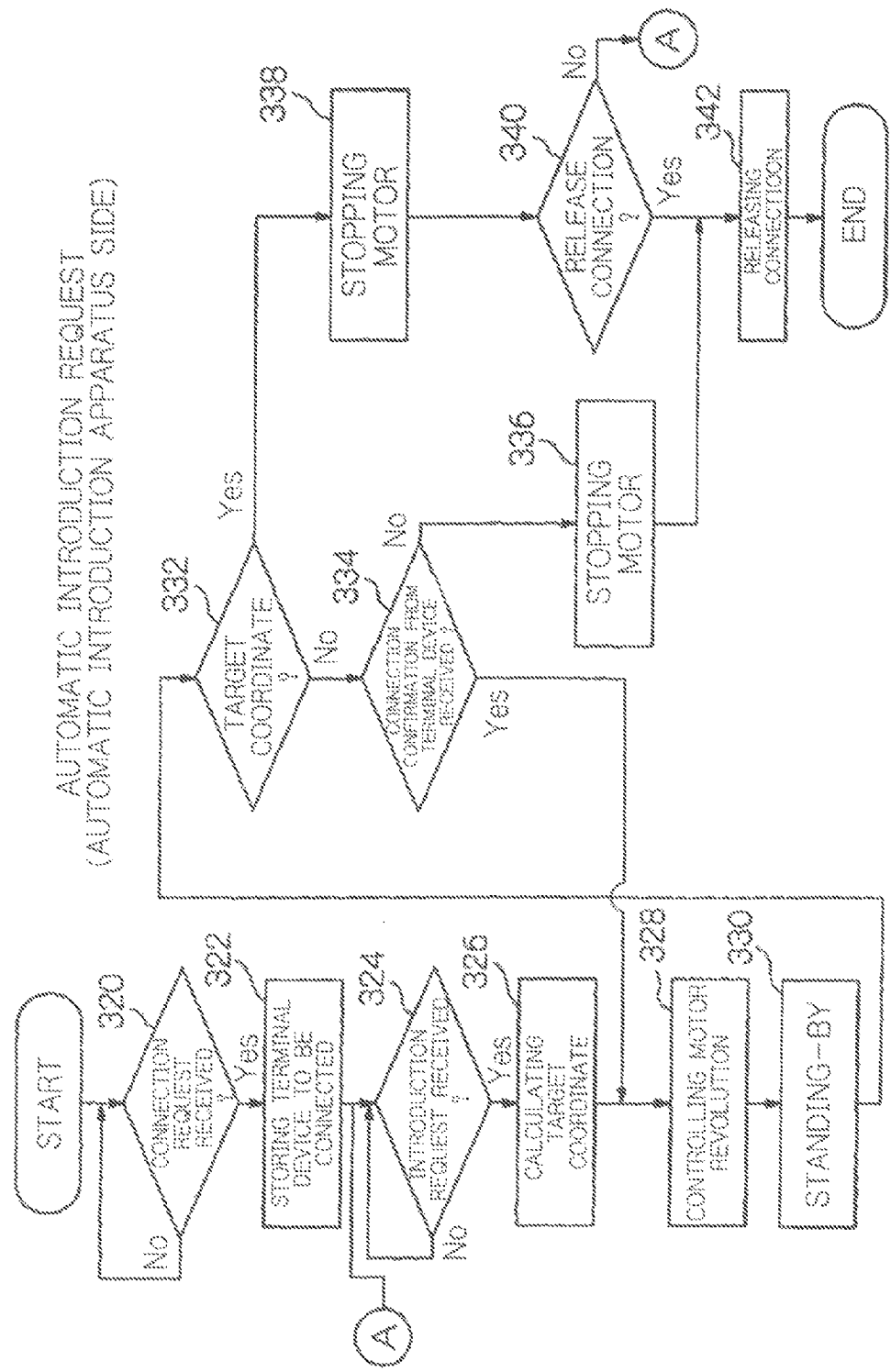
FIG. 11 is a flow chart showing a flow of processing of automatic introduction control executed in the automatic introduction apparatus side in the form of connection shown in FIG. 9.

A flow of control executed in the automatic introduction apparatus side to which the automatic introduction is to be requested will now be described with reference to a flow chart of FIG. 11. As illustrated in the drawing, it is firstly determined whether the connection request from the terminal device side has been received (Step 320). The apparatus stands by until it receives the connection request, and upon receipt (Step 320 affirmative determination), an address of a corresponding entity to be connected (a terminal device side) is stored (Step 322) and the connection to the terminal device side is then established. Subsequently, it is determined whether the introduction request has been received from the corresponding terminal device side connected to the apparatus (Step 324). The apparatus stands by until the request signal for introduction of a celestial object has been received, and upon receipt (Step 324 affirmative determination) a target coordinate of the target celestial object specified by the request signal for introduction of celestial object is calculated (Step 326), the rotational control to the motor of the telescope body is started (Step 328), and after the standing-by by the apparatus (Step 330), it is determined whether the telescope has reached the target coordinate (Step 332). If it has not reached the target coordinate (Step 332 negative determination), it is determined whether the connection acknowledgement signal from the terminal device (Step 308 of FIG. 10) has been received (Step 334). If receipt of the connection acknowledgement signal from the terminal has been confirmed (Step 334 affirmative determination), the process returns to Step 328, where similar processes are repeated until the target coordinate has been reached while the connection to the terminal device is being confirmed. If the target coordinate has been reached (Step 332 affirmative determination), the motor is stopped (Step 338), and it is determined whether the connection should be released, based on the request from the terminal device side and/or the observation schedule (Step 340). If the connection is not released (Step 340 negative determination), the process returns to Step 324, stands by for the introduction request from the terminal device side and similar processes are repeated. If the connection is released (Step 340 affirmative determination), the connection to the terminal device side is actually released (Step 342).

Exemplary applications of the configuration as shown in FIGS. 8 to 11 will be given below.

(An Independent Terminal with a Display and Input Function)

A terminal device of the prior art includes a display section and an input section that are incorporated in a single unit. However, the display section is desirably large in size in order to display a star map and/or an image captured through the telescope body (i.e., in order to increase a volume of information). On the other hand, an input section as small as a user can hold in his/her hand could be easily handled. To solve this conflicting demand, in the 1:n or n:m connection (FIG. 9), a terminal device 76 specialized for the image display and a terminal device 78 specialized for the input function are disposed separately as terminal devices, as shown in FIG. 8A.

A flow for controlling the Web server type automatic introduction apparatus 72a of a single telescope body by using this configuration will now be described with reference to FIG. 8B.

Figure 8B:
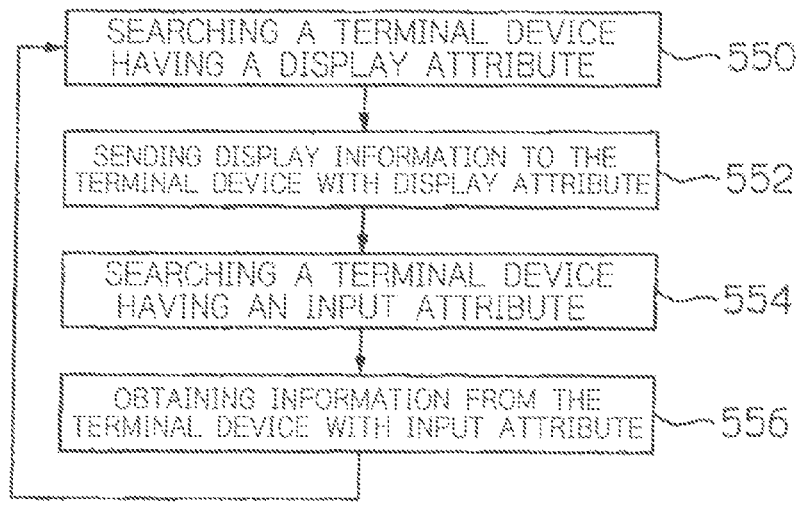
FIG. 8B is a flow chart showing an example of control on an input and a display by taking advantage of the Internet connection depicted in FIG. 8A.

As is shown in FIG. 8B, the Web server type automatic introduction apparatus 72a searches for the terminal device 76 having a display attribute via the Internet 70 (step 550). When the terminal 76 having a display attribute is detected, the information to be indicated is transmitted to the same terminal 76 having a display attribute (Step 552). Subsequently, the Web server type automatic introduction apparatus 72a searches for the terminal device 78 having an input attribute via the Internet 70 (Step 554). When the terminal 78 having an input attribute is detected, the information input by the user from the terminal is obtained (Step 556). The Web server type automatic introduction apparatus 72a executes an operation based on the input information and returns to Step 550 where a similar process is executed. Thus, the display section and the input section are not necessarily constructed as one unit, but it is also contemplated, for example, that the input section is manipulated as it is in a user's pocket and the display section is disposed externally, which is very effective for observation by a large number of people. If using the Internet and/or the LAN, such a configuration can be easily achieved, in which a plurality of display terminals are disposed at remote sites, allowing for observation at a plurality of locations by a large number of people. (1:n control)

Figure 12:
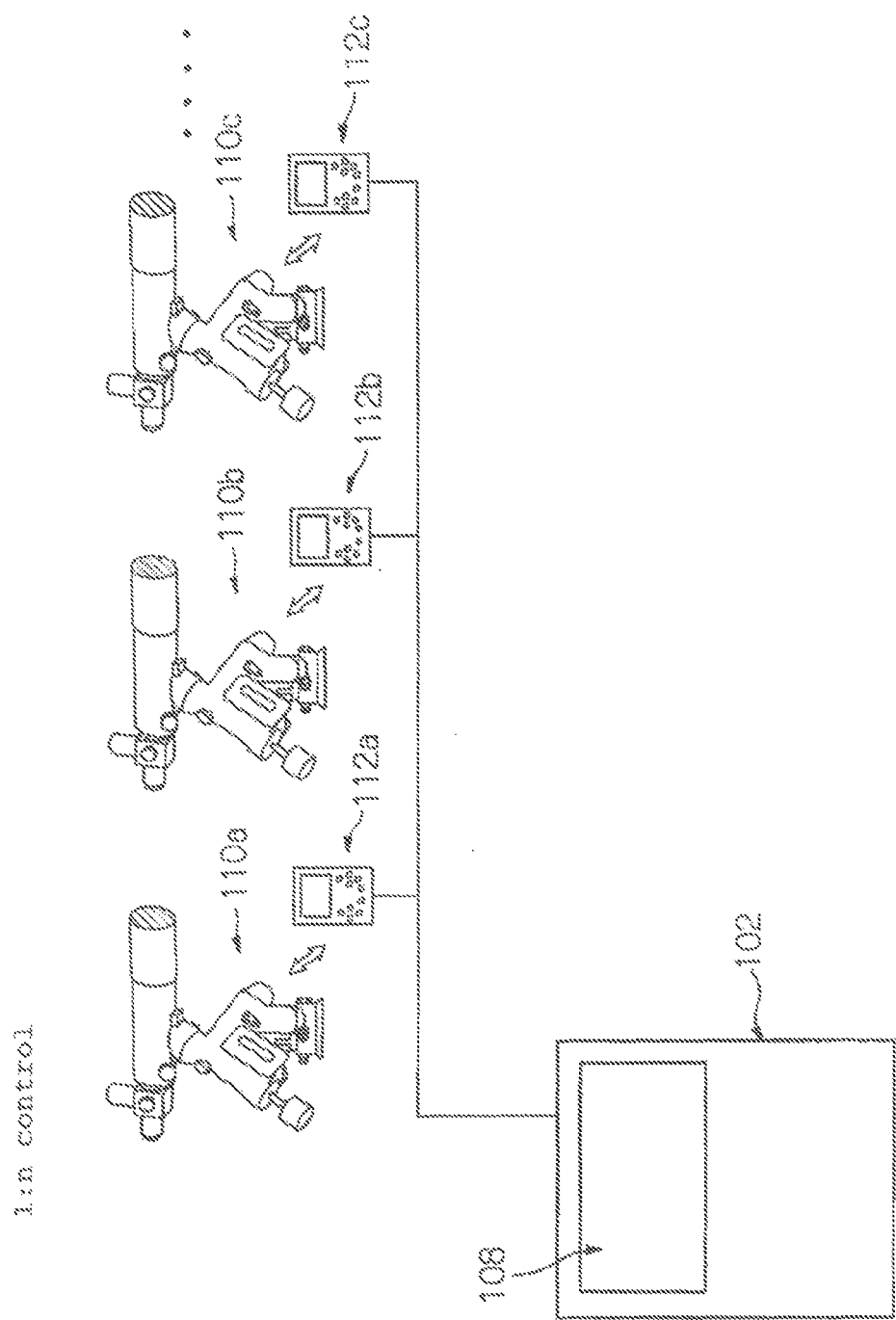
FIG. 12 is a schematic view showing an application of a 1:n astronomical telescope control system.

FIG. 12 shows an application of a control system for an astronomical telescope in the 1:n control manner.

The control system shown in FIG. 12 comprises a plurality of astronomical telescopes 110*a*, 110*b*, 110*c*, . . . , and a single terminal device 102 having a right of control to a plurality of automatic introduction apparatuses, said plurality of astronomical telescopes and said single terminal device being interconnected via an electric communication means, such as the Internet and a LAN (FIG. 8A). Each of the astronomical telescopes 110*a*, 110*b*, 110*c*, . . . is connected with each of the handsets 112*a*, 112*b*, 112*c*, . . . by a wired connection, preferably by a wireless connection. Those handsets may be a type of handset as shown in FIGS. 1 to 4 or FIG. 7. The automatic introduction apparatus can have the Web server function as shown in FIG. 7.

The terminal device 102 has a display section 108. This terminal device 102 may be configured by a handset similar to that described above or by a personal computer. Further, the terminal device 102 may be also connected to the astronomical telescope incorporated with the automatic introduction apparatus.

The control system as shown in FIG. 12 may be applicable to an occasion such as a celestial object observation and viewing session. For example, each participant may be provided with each of the astronomical telescopes 110*a*, 110*b*, 110*c*, . . . , and a docent is provided with the terminal device 102. The docent sends a connection request (Step 300 of FIG. 10) and an introduction request (Step 304 of FIG. 10) from his/her terminal device to every one of the astronomical telescopes to provide block control of automatic introduction to all of the astronomical telescopes of the participants, thereby allowing every participant to observe the same celestial object. It is a matter of course that the introduction of each different target celestial object into each different astronomical telescope may be requested from the terminal device 102.

Although each astronomical telescope may start the motor rotation immediately upon receipt of the introduction request from the terminal device 102, in order to improve the safety, each of the handsets 112*a*, 112*b*, 112*c*, . . . , may be provided with an operation starting button, which is pressed by the participant to thereby start the rotational control of the motor in response to the introduction request. The latter case allows the introduction to start after confirming that the participant has moved away from the telescope, thus improving safety. It is preferred that each automatic introduction apparatus may comprise either one of an alarm means for giving an alarm sound or an alarm indication when starting the driving of the astronomical telescope and a stop means for an emergency stop of the rotational driving of the astronomical telescope when communication with the terminal device 102 has been shutdown.

It is further contemplated that in each astronomical telescope a handset may be provided with a priority operation button serving for giving a priority to a command from a handset over a command from the terminal device 102. For example, safety may be further improved by provision of a button for an emergency stop of a motor rotation during the automatic introduction. Further, it is also contemplated that pressing down the priority operation button can direct the astronomical telescope to a desired direction independently of the command from the terminal device.

It is further contemplated that the terminal device 102 and/or respective handsets may have a function for transferring the right of control of the control system from the terminal device 102 to any one of the handsets 112*a*, 112*b*, 112*c*, . . . . In this case, a participant is allowed to automatically introduce his/her target celestial object to another astronomical telescope so as to give an introductory presentation to the others.

Further, the terminal device 102 may include an individual control mode for controlling exclusively at least one specific automatic introduction apparatus. This allows individual instruction to the participants according to their different learning levels.

The display section 108 of the terminal device 102 may indicate the received information from each of the automatic introduction apparatuses in order to assist the management and instruction control of each automatic introduction apparatus by the terminal device 102. This information may include at least one item selected from a group consisting of, for example, an ending state of each operation of the automatic introduction apparatus, a set of information indicating the azimuth or the position on the celestial sphere to which each astronomical telescope is oriented, a set of electronic mail information from each user of each automatic introduction apparatus and an image data of celestial object taken through each astronomical telescope. Further, those types of information may be transferable among the automatic introduction apparatuses.

To execute the automatic introduction by each astronomical telescope more efficiently, the terminal device 102 may be provided with a function to store the information for the alignment required for the automatic introduction by each astronomical telescope and to re-establish the information for the alignment for each of the automatic introduction apparatuses upon subsequent activation of the control system. This can effectively eliminate the aligning work by the participant from the second and subsequent observation and viewing sessions, enabling the astronomical observation and viewing session to start more quickly.

(n:1 Control)

Figure 13:
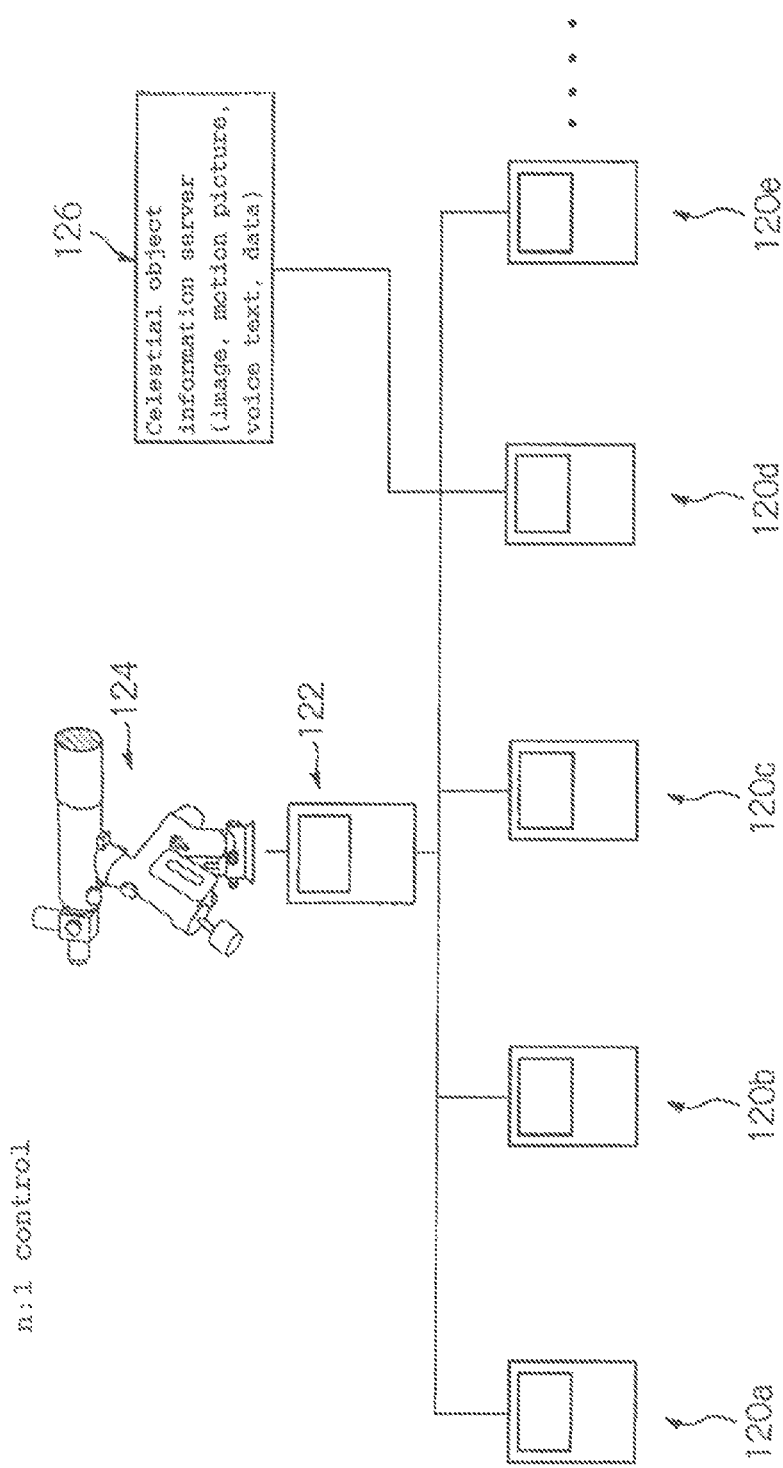
FIG. 13 is a schematic view showing an application of an n:1 astronomical telescope control system.

FIG. 13 shows an application of a control system for an astronomical telescope on the basis of n:1 control.

The control system as shown in FIG. 13 comprises a single astronomical telescope 124 incorporated with an automatic introduction apparatus, a handset 122 provided thereto for manipulating an input to the astronomical telescope 124, and a plurality of handsets 120*a*, 120*b*, 120*c*, 120*d*, 120*e*, . . . , connected to the handset 122 or the automatic introduction apparatus of the astronomical telescope 124.

A plurality of handsets 120*a*, 120*b*, 120*c*, 120*d* and 102*e* sends request signals for introduction of a celestial object via electric communication means. If request signals for introduction of celestial object are received from two or more handsets (for the receipt of a plurality of introduction requests at Step 324 of FIG. 11), the automatic introduction apparatus 124 allocates the execution sequence of the request signals for introduction of a celestial object in accordance with a predetermined sequence and allows for a sequential automatic introduction of each target celestial object in accordance with the execution sequence.

This predetermined execution sequence may be defined by, for example, either one of:

(1) a sequence in which the request signal for introduction of a celestial object received earlier by the automatic introduction apparatus 124 has a priority over others;

(2) a sequence in which the request signal for introduction of a celestial object from other handsets 120a, 120b, 120c, 120d and 120e, capable of being manipulated by the handset 122 has a priority over others;

(3) when there are differences in receipt time among a plurality of request signals for introduction of a celestial object, falling within a predetermined time period, a sequence in which the request signal for introduction of a celestial object specifying a celestial object closer to the direction to which the astronomical telescope 124 is currently oriented has a priority over others.

The handsets 122, 120a, 120b, 120c, 120d, 120e, ..., comprise display sections. These display sections are able to display at least one item selected from a group consisting of, for example, an ending a state of each operation of the automatic introduction apparatus 124, the information indicating the direction or the position on the celestial sphere to which the astronomical telescope is oriented, the information relating to the celestial object to be introduced by the astronomical telescope, and the image data of the celestial object captured through the astronomical telescope. The celestial object information server computer 126 is connectable to the electric communication means. The image, motion picture, voice, briefing paper and data concerning the celestial object to be introduced may be transmitted from the celestial object information server computer 126, which are received and in turn displayed and reproduced in respective handsets. It is to be noted that the celestial object information server computer 126 may be applicable to the 1:n control of FIG. 12.

(Serial Observation System)

A serial observation system which allows a serial tracking observation of a celestial object by a plurality of astronomical telescopes can be configured by providing a sequential switching control to a plurality of automatic introduction apparatuses that are interconnected to each other by taking advantage of a control system for an astronomical telescope according to an embodiment of the present invention. This serial observation system can be constructed by, for example, interconnecting a plurality of automatic introduction apparatuses, each equipped with a Web server function, via the Internet or the like so that the information can be transmitted among those automatic introduction apparatuses. Alternatively, the system can be constructed by using a single Web server computer for managing and controlling the automatic introduction apparatuses interconnected to one another, such that the computer may control individual automatic introduction apparatuses so as to enable the serial observation.

Figure 14:
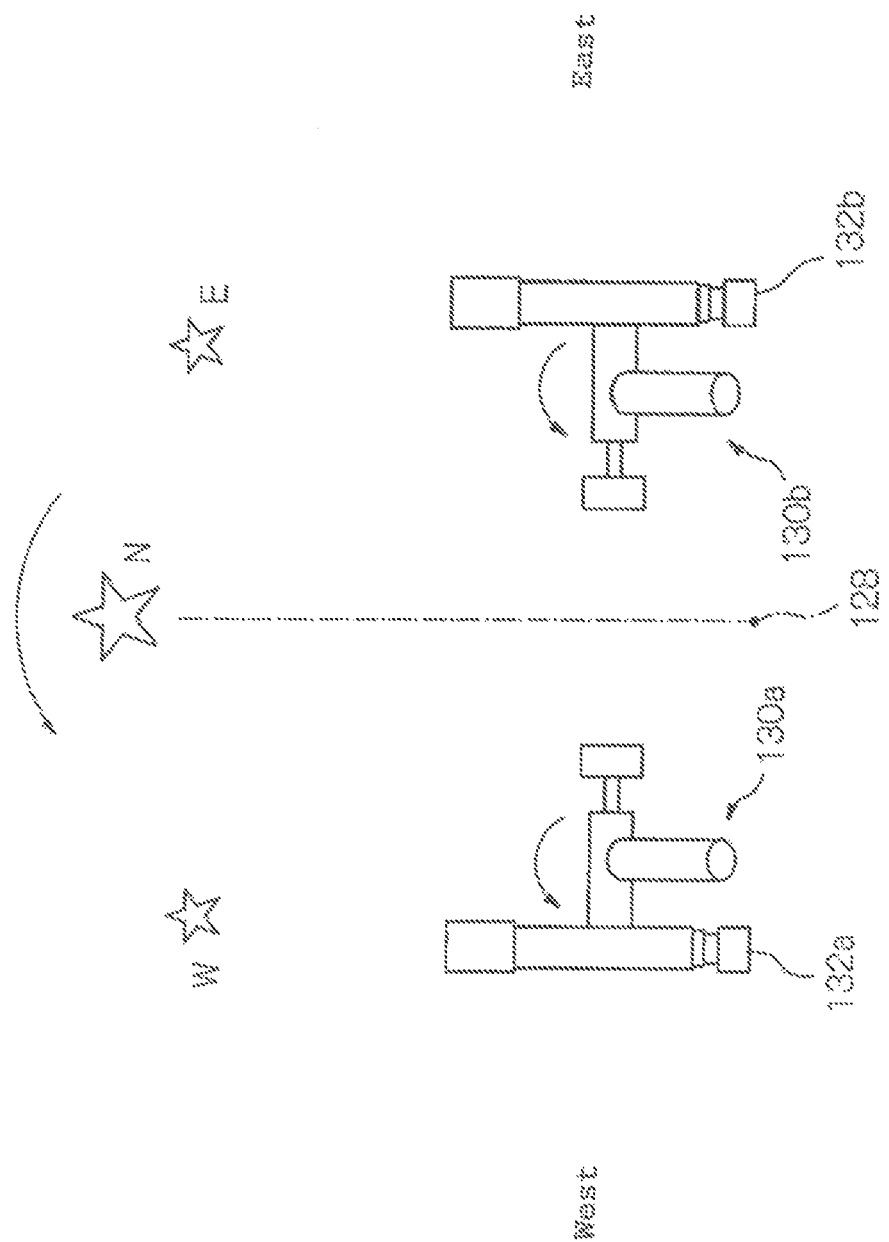
FIG. 14 is a schematic view showing a first example of a continuous observation system.

FIG. 14 shows an example of the serial observation system. The illustrated system comprises two astronomical telescopes 130a and 130b, each equipped with the German equatorial telescope. Those astronomical telescopes are equipped with CCD cameras 132a and 132b, respectively, thus allowing them to capture images of target celestial objects.

It is assumed by way of example that one astronomical telescope 130a observes a celestial object E located in the east side with respect to the meridian 128. At this time, the lens barrel of the astronomical telescope 130a is located in the west side with respect to the German equatorial telescope mount. The other astronomical telescope 130b is placed in a stand-by state under a condition of the lens barrel having been inverted so that the lens barrel is located in the east side with respect to the German equatorial telescope mount.

When the astronomical telescope 130a has finished observing the celestial object E and is then to start the observation of the celestial object W located in the west side of the meridian 128, there is a potential problem in a case that no modification is made that a lens barrel and/or a CCD camera may interfere with the equatorial telescope or a tripod (not shown). According to the prior art, it has been required that the lens barrel must be inverted by changing its position with respect to the mount defined by the east and the west direction, resulting in a downtime inhibiting the observation during this inverting operation. The serial observation system of the present embodiment, in this case, provides a control in such a manner that the celestial object W is observed (image-captured) by the astronomical telescope 130b whose lens barrel has been previously inverted. This can minimize the downtime inhibiting the observation and allows the celestial object to be observed (image-captured) continuously.

It is assumed further that the astronomical telescope 130a is observing the celestial object N. When the celestial object N is transferred over the meridian 128 to the west side, the observation task of the celestial object N is transferred quickly to the astronomical telescope 130b. This can reduce the time necessary for the lens barrel inversion so as to provide the observation (image-capturing) of the same celestial object N continuously.

Although the example of FIG. 14 uses two astronomical telescopes, using three or more astronomical telescopes may be feasible.

Further, for a visual observation using the Newtonian reflecting telescope comprising an eye piece mounted on a side face of the lens barrel, the orientation of the eye piece would be greatly changed relative to the east or the west with respect to the meridian. In a case of using this serial observation system, if in the situation of crossing the meridian, the automatic introduction of the celestial object under the observation is achieved with the telescope whose lens barrel has been previously inverted with the eye piece position adjusted for the visual observation, then even during the visual observation, the time required for the inversion of the equatorial telescope and/or the rotation of the lens barrel can still be reduced.

The serial observation system according to the present embodiment may be applicable to the serial observation of a celestial object moving at a high speed, such as a satellite. The application thereof is shown in FIG. 15.

Figure 15:
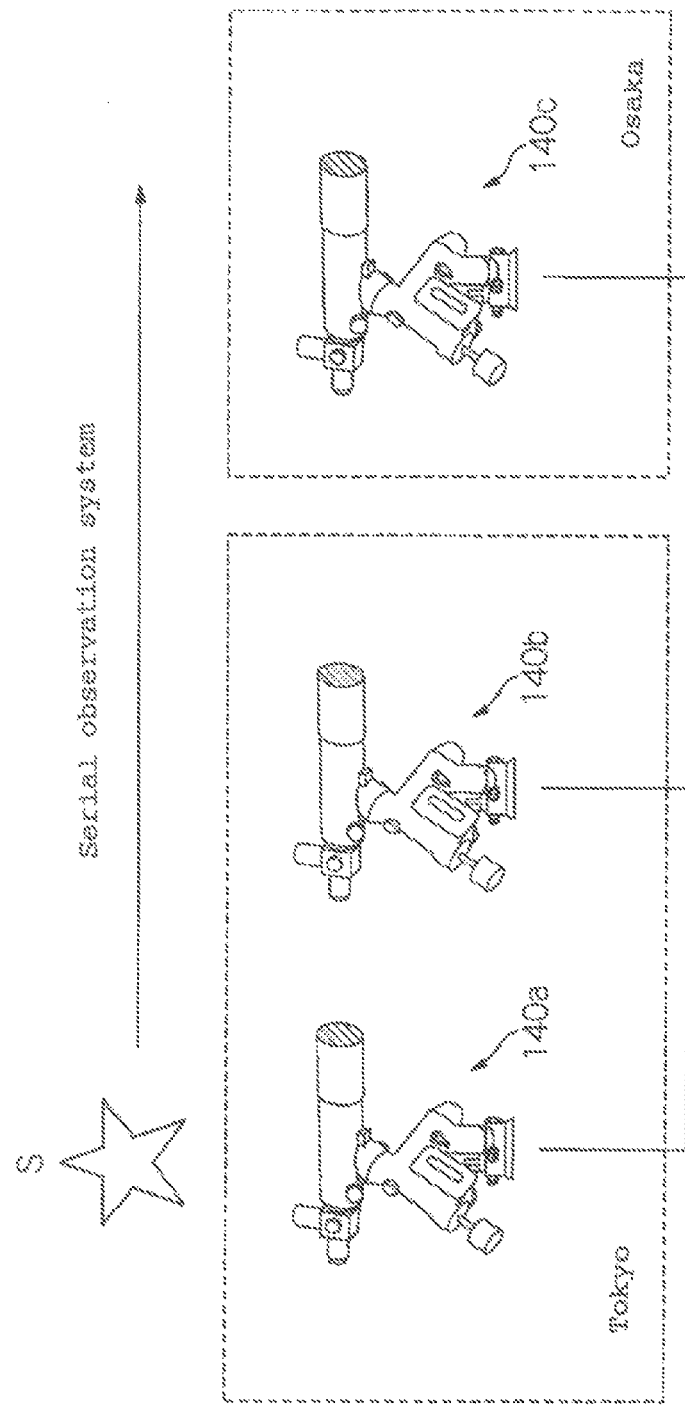
FIG. 15 is a schematic view showing a second example of a continuous observation system.

Assuming such a situation as shown in FIG. 15 in which a plurality of astronomical telescopes 140a, 140b, 140c, ..., incorporated with a plurality of automatic introduction apparatuses are distributed at different sites (for example, in Tokyo, Nagoya and Osaka), the astronomical telescope 140a starts the observation of a satellite S moving at high speed along a low-altitude orbit at a first point of emergence of the satellite. The astronomical telescope 140a transmits the information on the movement of the satellite S to the other sites, while observing the satellite S. Each of the automatic introduction apparatuses estimates and calculates a time, a coordinate of the satellite S emerging in its installation site based on the received movement information, and the astronomical telescope is directed to the coordinate of emergence at the time when the observation is possible, and starts the observation. By executing this work serially at a plurality of sites in a chain, the serial tracking observation of a celestial object moving at high speed is made possible.

In another example of the serial observation system of FIG. 15, each of the automatic introduction apparatuses distributed in respective sites comprises an observation area detection means for detecting an area on the celestial sphere available for the celestial object observation in its associated site. This observation area detection means comprises a CCD camera and an image analyzing unit for identifying an area that permits the celestial object observation and an area that does not permit the celestial object observation (where the image-capturing is inhibited by obstacles including clouds, mountains, buildings and environmental pollution) from the image captured by the CCD camera.

In this serial observation system, as the celestial telescope 140a during the observation has changed its direction to an area out of a celestial object observation allowable range detected by the observation area detection means, the control is sequentially shifted to any one of other automatic introduction apparatuses 140b, 140c which has its associated observation area including the area out of the allowable range. This enables serial observation of the celestial object across fine intervals, for example.

(Observation Information Sharing System)

Conventionally, a telescope body and an automatic introduction apparatus are typically distributed and delivered to a user packed as a set. In contrast, the observation information sharing system of the present embodiment has achieved an additional function of the automatic introduction apparatus via a relay Web server.

Figure 16:
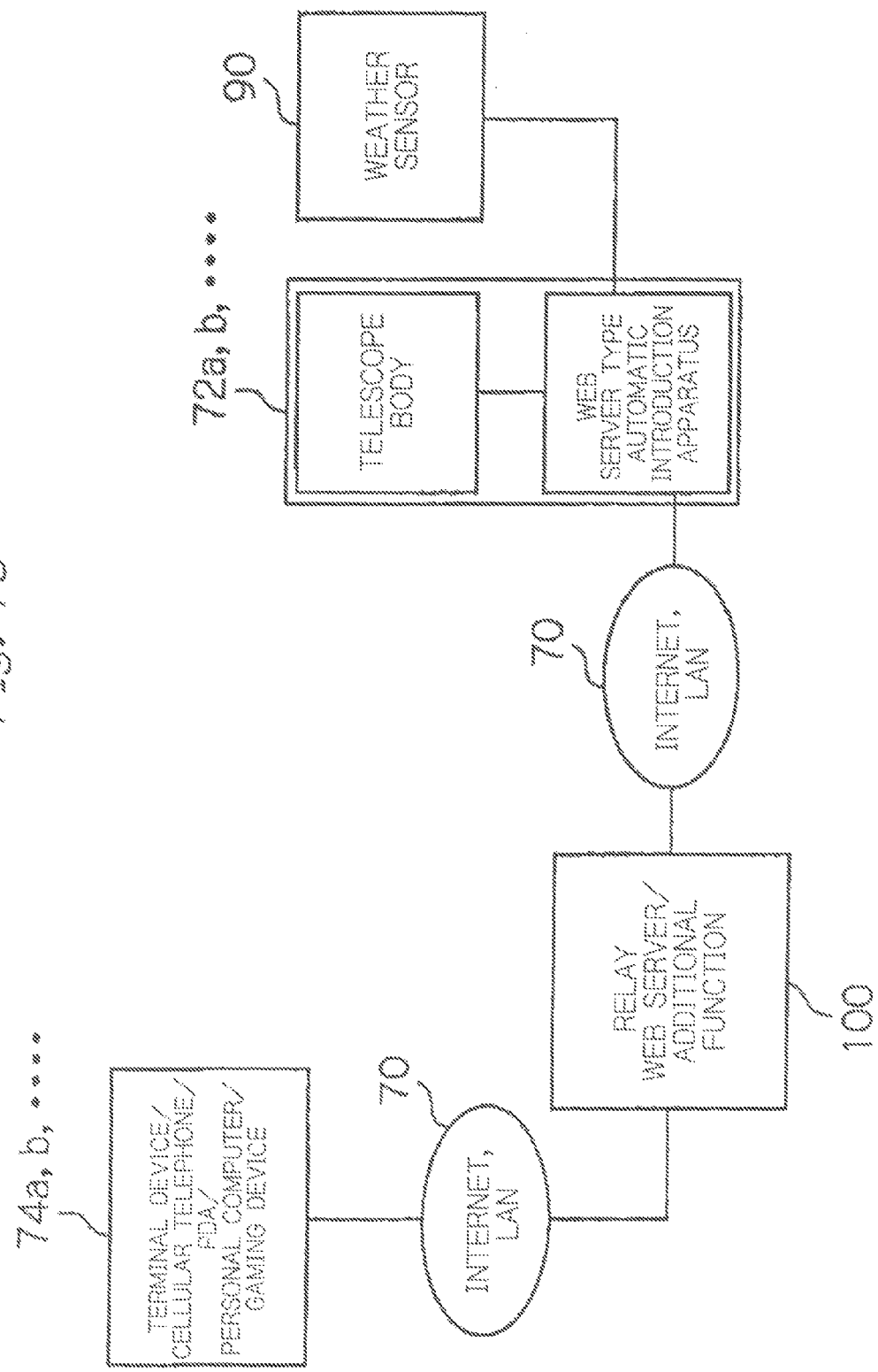
FIG. 16 is a schematic diagram of a relay web server computer for providing a set of astronomical information according to a fourth embodiment of the present invention.

FIG. 16 shows a relay Web server computer for sharing observation information 100 equipped with such an additional function. As shown in FIG. 16, the relay Web server computer 100 is connected to Web server type automatic introduction apparatuses 72a, 72b, . . . , and to a variety of types of terminal devices 74a, 74b, . . . , via the Internet 70 (or a LAN) so as to make the data transmission available among them.

The relay Web server computer 100 includes, for example, a new celestial object information search function for making an automatic access to an astronomical information site to obtain a set of information about a new celestial object, a weather information search function for making an access to an information site for a weather satellite and/or a weather forecast to obtain weather information, a menu function for editing the information input from the input device and the information searched by the search function according to a predetermined introduction menu program and for transmitting the edited information to the Web server type automatic introduction apparatuses 72a, 72b, . . . , a help function to execute an operation and/or a collection of information on behalf of and in response to the request from the terminal devices 74a, 74b, . . . , or the Web server automatic introduction apparatuses, and a data/program transmission function for transmitting the data/program. Those functions can be achieved by a CPU for carrying out the Web server function, a program for causing the CPU to execute the above-described respective functions, a storage device such as a hard disk, and an input device (a keyboard, a mouse, a DVD±R/±RW/ROM drive, a CD-R/RW/ROM drive and the like).

In the storage device of the relay Web server computer 100 are stored a new celestial object database containing the information relating to the new celestial objects, a version-up database containing version-up data and/or a firmware program for the terminal devices or the Web server type automatic introduction apparatus, a celestial object observation assisting database containing a set of information essential to the celestial object observation, such as weather information and/or observation site information, and a program database containing a program in the form of an object executable by the Web server type automatic introduction apparatuses 72a, 72b, . . . . These databases are constantly renewed by the input from each of the above-described search functions and the input device.

The information providing service taking advantage of the relay Web server computer 100 includes the following, for example.

(1) A New Celestial Object Introduction

For example, a coordinate at the present time and a moving speed along the right ascension and the declination of a new comet is sent to the Web server type automatic introduction apparatuses 72a, 72b, . . . . This allows the Web server type automatic introduction apparatuses not only to perform an automatic introduction of the new comet but also to accommodate automatic tracking. Further, a type of information including a magnitude and an orbit may be provided.

The above description can be applied to other new celestial objects.

(2) Version-Up

The data and/or the firmware program that have been upgraded is distributed to the terminal devices 74, 74b, . . . , or the Web server type automatic introduction apparatuses 72a, 72b, . . . .

(3) A Celestial Object Introduction Menu

A recommended celestial object introduction menu in association with a current season or term as well as other introduction menus for the celestial objects or topics may be executed by the Web server type automatic introduction apparatuses 72a, 72b, . . . . These introduction menus comprise a command for introducing a plurality of selected celestial objects sequentially and an introductory description of each of the celestial objects.

It is to be noted that the introduction menu may be sent as data to be executed by a menu program that has been already installed in the Web server type automatic introduction apparatus. Alternatively, the introduction menu may be sent to the Web server type automatic introduction apparatus as a program, where it is transformed into executable form and then the introduction menu is executed.

(4) Help Function

An operation and collection of information in response to a request from the terminal device or the Web server type automatic introduction can be executed on their behalf. For example, when the arithmetic operation load is heavy and a longer time must be necessary for the automatic introduction in the Web server type automatic introduction apparatus, a part or all of the arithmetic operation may be executed by the help function on behalf of the Web server type automatic introduction apparatus. Further, when no load is applied to any one of the Web server type automatic introduction apparatuses, that Web server may be instructed to carry out a part of the arithmetic operation.

The service can accommodate mass-data transmission.

(5) Providing the Observation Site Information.

If the weather sensor 90 has been connected to each of the Web server type automatic introduction apparatuses 72a, 72b, . . . located at respective sites, the weather information of respective sites can be sent to each of the terminal devices. Those sets of weather data may be compensated by the information obtained from the weather forecast site. Since the user can know in advance which district has good weather, this service is useful for the celestial object observation.

It is further contemplated that a distance may be calculated from a meteor, a trace of meteor and a fireball that have been image-captured by the Web server type automatic introduction apparatuses 72a, 72b, . . . at respective observation sites, and/or a geometry of a minor planet may be arithmetically derived from an occultation observation result for the minor planet at each site, wherein the derived results may be sent back to respective terminal devices and/or automatic introduction apparatuses.

The relay Web server 100 may be installed within an astronomical telescope distributing company, for example, from which the server can provide the information providing service as described above, thereby achieving a user-friendly celestial object observation system. If the relay Web server is provided with an accounting function, the server can collect a charge depending on the usage of the additional services.

In order to execute the above-described service function in a carefully thought out manner as per each automatic introduction apparatus, preferably each one of the plurality of automatic introduction apparatuses sends the observation information relating to respective apparatuses. In this case, the relay Web server 100 executes a predetermined service associated with each one of the plurality of automatic introduction apparatuses based on the received observation information relating to each apparatus.

The observation information to be sent may include a set of information about a celestial object to be introduced, which allows the user to identify the introduced celestial object, in addition to the information for a model type of the apparatus, version-up information, and operating hours. In one way of application of the observation information, the relay Web server 100 can have a function for aggregating respective sets of information of the introduced celestial objects to make a ranking thereof. In this case, preferably, the following services may be executed.

(1) The ranking information of the introduced celestial object is informed to a plurality of automatic introduction apparatuses.

(2) At least one celestial object is selected from the ranking information of the introduced celestial object and a command is given to the plurality of automatic introduction apparatuses to introduce said celestial object.

(3) A command is given to the plurality of automatic introduction apparatuses so as to introduce the celestial objects of high rank sequentially in accordance with the introduced celestial object ranking information.

This service allows each user to have a knowledge of a popular celestial object in advance and thus to make an immediate observation thereof.

Further, the relay Web server 100 may also have a function for classifying the type of user of each of the automatic introduction apparatuses based on the received observation information. The classified type of user may include, for example, a type of interesting celestial object (the moon, a planet, the sun, a galactic cluster of nebula, an extragalactic cluster of nebula, a minor planet, a comet, a nova/supernova and a variable star), a learning level from a beginner to an expert, and an observation style (photographer, visual observer, academic observer and hobbyist) and so on.

One method can be contemplated by way of example as a means for classifying the type of user in which the relay Web server 100 has stored a statistic database in advance, including a number of celestial object introductions as per each user type, a telescope operation time, and a type of introduced celestial object, based on information gathered from a large number of people, and a determination is made based on the received observation information to classify a particular user.

The relay Web server 100 executes a control to each one of the automatic introduction apparatuses in association with the classified type of user or a transmission of the celestial object information thereto as the service. This can provide each user categorized as a beginner, an expert and the like with a service of optimal celestial object information.

Further, the relay Web server 100 may provide either one form of service selected from a group consisting of a chat, a message board and a TV conference system. A use of this service may be restricted such that the access is only allowed between or among the automatic introduction apparatuses determined to be in the observation of the same celestial object based on the observation information or the automatic introduction apparatuses of the same type of users.

This can facilitate the acquisition rate of the information to be required for the observation.

Fourth Embodiment

Fully Automated Introduction Apparatus

Figure 17:
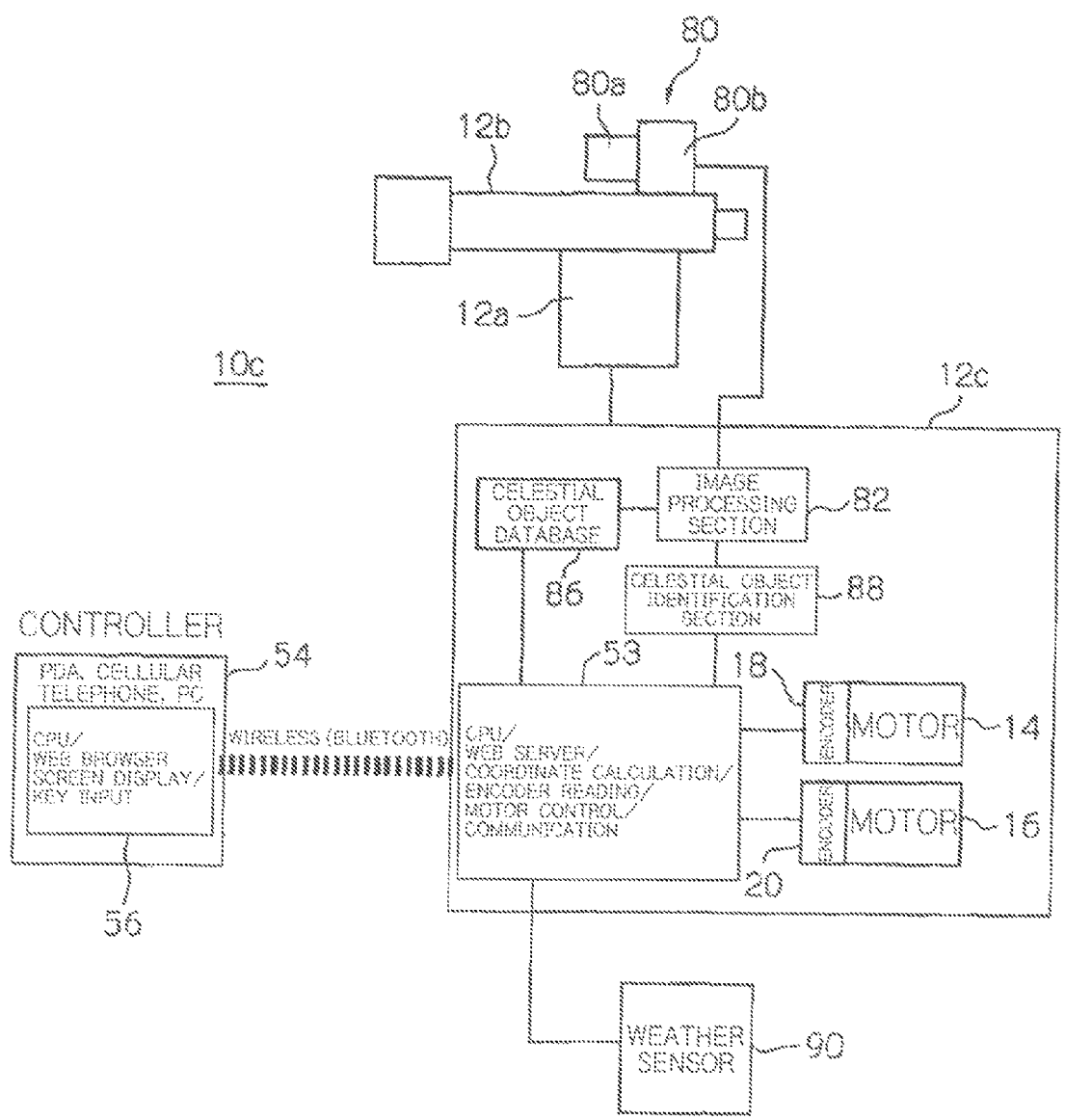
FIG. 17 is a schematic diagram of a fully automated introduction apparatus according to the fourth embodiment of the present invention.

FIG. 17 shows a schematic configuration of a fully automated introduction apparatus 10c according to a fourth embodiment of the present invention. It is to be noted that the features similar to those in the embodiments of FIGS. 1 to 3 are given the same reference numerals and detailed descriptions of similar features are herein omitted, only different features being described.

A fully automated introduction apparatus 10c is intended to automate an initial setting of an automatic introduction type telescope of the prior art and also to improve precision in an automatic introduction.

To achieve this object, the fully automated introduction apparatus 10c comprises an image-capturing unit 80 integrally mounted to a lens barrel 12b in parallel with an optical axis of the telescope. This image-capturing unit 80 comprises a lens section 80a designed as a lens of variable focal distance, such as a zoom lens of broad scaling factor covering from a wide angle side to a telescopic side, for example, and a camera section 80b comprising a CCD camera or a CMOS image sensor. The lens section 80a may be incorporated with a motor and an encoder for executing the zooming operation, though not shown, in which the focal distance can be set at each time by a time based on a command from a CPU 53.

The automatic introduction apparatus 10c comprises an image processing section 82 serving for a converting process of image data taken by the image-capturing unit 80, a celestial object database 86 storing a set of information concerning respective celestial objects in a whole sky, and a celestial object identification section 88 for comparing the arrangement data of the celestial object that has been converted by the image processing section 82 with the arrangement data of the fundamental celestial object that has been extracted from the celestial object database 86, so as to identify the area (and the celestial object) that has been captured by the image-capturing unit 80.

Since making the comparison by using the image data captured directly requires considerable arithmetic operation time, the image processing section 82 converts the captured image data to the compressed data containing a minimum volume of information required for identifying respective celestial objects within the captured image area. For example, a contour of each celestial object is extracted from the pixel data of the captured image area, and the arrangement data of celestial object is created, which contains a position coordinate and a brightness of each extracted celestial object (which may be estimated from an average value of output intensity of image pickup device within the corresponding astronomical area, for example). It is a matter of course that the arrangement data of the fundamental celestial object of the celestial object database 86 may be created in advance in the same manner as the above for respective celestial objects in the whole sky. It is to be noted that in order to reduce the possibility that the CCD noise is extracted as a celestial object by mistake, the image processing section 82 may provide addition operations of a plurality of images taken in the same area so as to improve the S/N ratio.

Preferably, the celestial object identification section 88 may be configured as an arithmetic operation circuit independently from the CPU in order to reduce a loading on the CPU 53 in association with the comparing operation. In one example of the comparing operation, the arrangement data of celestial object containing the position coordinate and brightness of each celestial object is compared with a plurality of arrangement data of a fundamental celestial object provided as a candidate that has been obtained by extracting from the celestial object database 86 while shifting one-by-one a region of the same area, so as to calculate the similarity therebetween, in which the candidate arrangement area of celestial object giving the highest similarity can be identified as the image-captured area taken by the image-capturing unit 80.

To achieve the fully automated introduction apparatus which will be described later, the CPU 53 comprises, in addition to the Web server type automatic introduction function similar to that of the CPU 52 of the second embodiment, a function for detecting a coordinate position of the direction to which the telescope is oriented from the position coordinate of the celestial object identified by the celestial object identification section 88 and determining any deviation from the target celestial object based on the coordinate position. So long as this function is provided, the CPU 53 may employ the CPU of the first embodiment that has not been equipped with the server function. Advantages provided by the CPU 53 equipped with the Web server function may include its ability to renew the celestial object database 86 so that it can reflect a certain type of information on an emergence of a new celestial object, such as a comet, a minor planet, a nova and a supernova, and/or a change in the luminosity of a variable star.

The CPU 53 is optionally connected with a weather sensor 90. When the access is made remotely to achieve the fully automated introduction, this allows opening and closing of the observation room depending on the weather and climate, and further to take advantage of the information indicative of the direction or the altitude of cloud.

The image-capturing unit 80 is not necessarily of external type but may be of direct detection type in which the image-capturing unit 80 is detachably inserted in an optical path of the telescope lens barrel 12b so as to directly capture the light passing through an objective lens of the telescope or to detect the light guided from a light switching device such as a miller inserted into the optical path. In case of the direct detection type, the image-capturing unit 80 may be designed such that the lens section 80a is removed and the optical system of the lens barrel 12b is used to carry out the image-capturing of direct focusing or that the lens section 80a functions as an eye piece of variable scaling factor with respect to the objective lens of the lens barrel 12b. Alternatively, such a configuration may be contemplated in which the image-capturing in the wide angle side is carried out by the external image-capturing unit, while the image-capturing in the telescopic field side aiming for a maximum precision must be carried out by a separate image-capturing unit of direct detection type.

Figure 18:
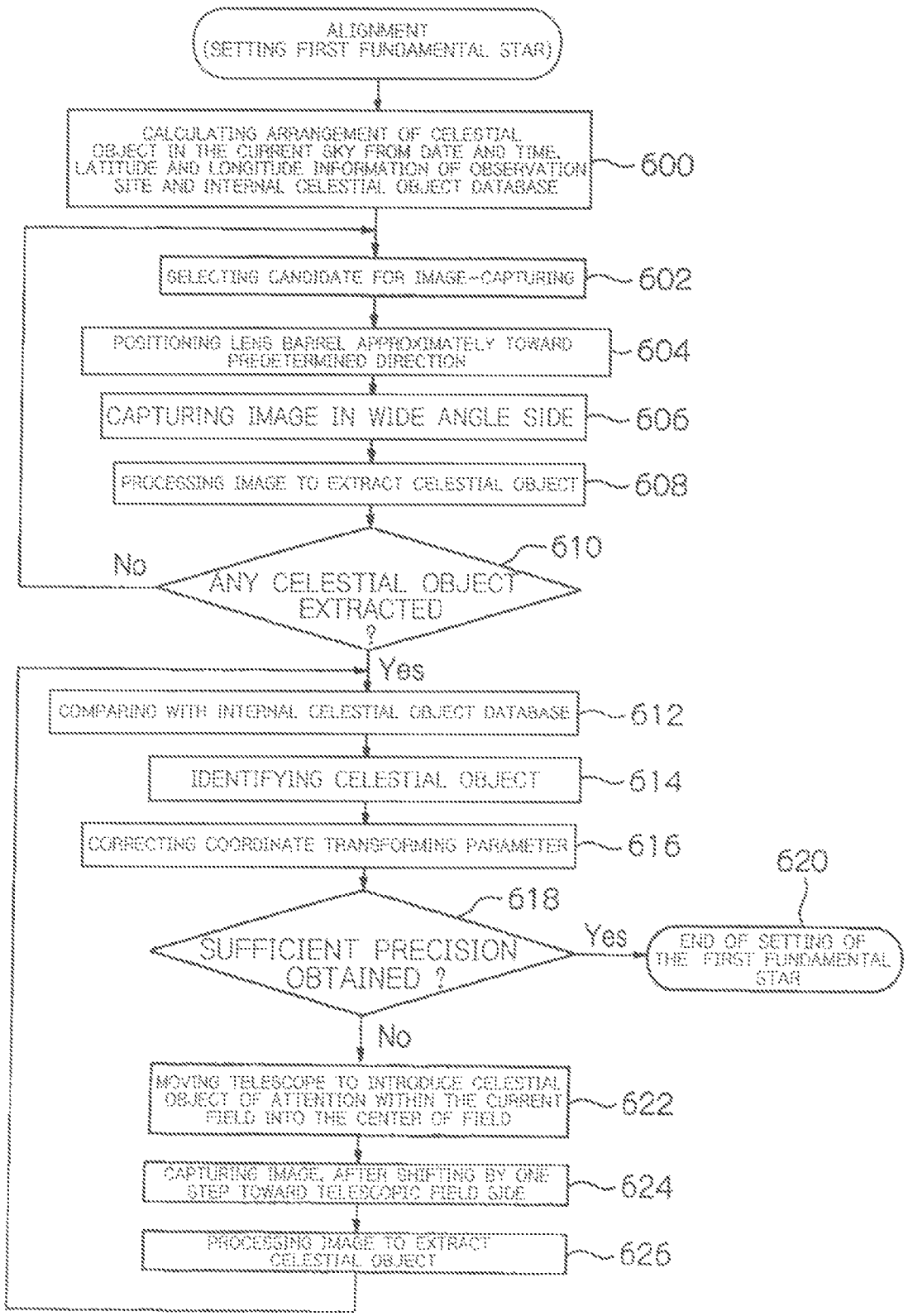
FIG. 18 is a flow chart showing a flow of processing for executing automatic alignment (setting a first fundamental star) in a telescope having the fully automated introduction apparatus incorporated as shown in FIG. 17.
Figure 19:
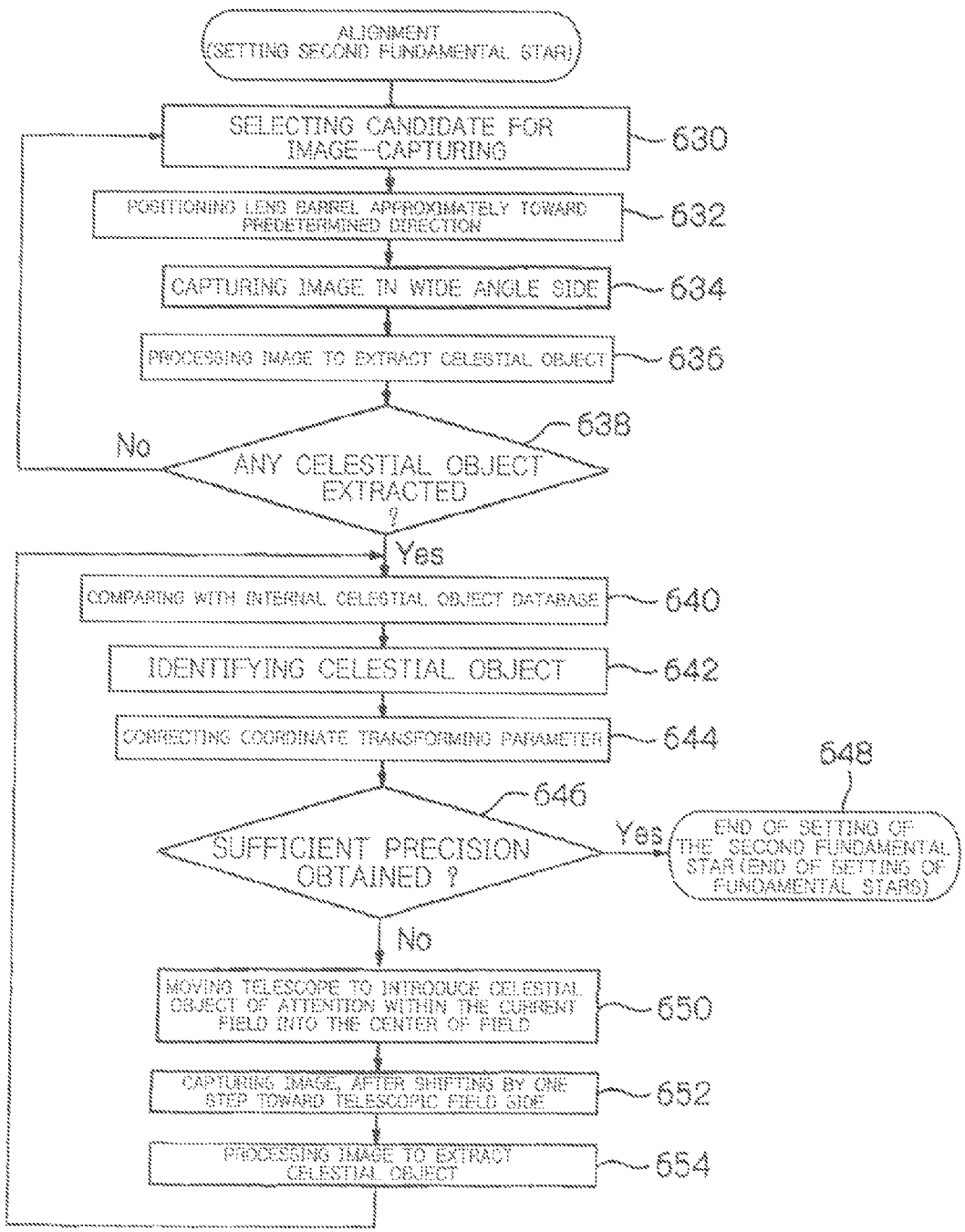
FIG. 19 is a flow chart showing a flow of processing for executing automatic alignment (setting a second fundamental star) in a telescope having the fully automated introduction apparatus incorporated as shown in FIG. 17.

A flow of an automatic alignment in a fully-automated introduction apparatus 10c will now be described by using FIGS. 18 and 19. FIGS. 18 and 19 show an example for automatically detecting by using two fundamental stars through what kind of coordinate transformation a virtual coordinate system of the telescope on an observation site acknowledged by the CPU relates to the celestial coordinate system capable of specifying the coordinate position of each celestial object.

As shown in FIG. 18, firstly, an arrangement of celestial objects in the current sky is calculated from a set of initial parameters including a date and time and the latitude and longitude information of the observation site and an internal celestial object database 86 (Step 600). It is to be noted that the information of date and time may be obtainable from an internal clock such as an electric wave clock, while the latitude and longitude information in the observation site may be represented by a value stored in a flash memory which has been previously input by the user or obtainable from the GPS.

Subsequently, the first candidate of the celestial object for the image capturing that is expected to be in a state of emergence from the calculated arrangement of celestial object in the current sky is selected (Step 602). During this process, in order to exclude the area in which the field of view is blocked by artificial buildings and street lamps, equipment such as an infrared telescope may be mounted in parallel and the determination as to whether the celestial object extraction is acceptable is made from the information thereof and the captured image data, thereby facilitating a quick and reliable selection of the candidate for the image-capturing. Further, the weather sensor 90 may be used in combination so that the area of no cloud in the sky may be selected as the candidate for the image-capturing.

Subsequently, the lens barrel 12b is set toward a predetermined direction (Step 604). For example, the motor may be controlled such that the lens barrel 12b is automatically positioned toward the direction of the selected candidate for the image-capturing under the condition that the user, in the initial setting stage, positions the lens barrel 12b to be directed, for example, approximately toward the west with a horizontal posture. Alternatively, the telescope may be equipped with an azimuth sensor and a gradient sensor as its internal components so that the current location of the telescope can be calculated from their output signals and based thereon the motor may be controlled such that the lens barrel 12b is automatically positioned approximately toward the direction of the selected candidate for the image-capturing.

After the lens barrel 12b has been directed approximately to the first candidate for the image-capturing, the lens section 80a is set in the wide angle side and the image is then captured (Step 606). Once the captured image data has been transferred to the image processing section 82, the image processing section 82 executes an image processing on the captured image data and an extracting work of the celestial object within an area of candidate for the image-capturing (Step 608). It is then determined whether the celestial object has been extracted within the area of the candidate for the image-capturing (Step 610). If the celestial object has not been extracted (negative determination at Step 610), the process returns back to Step 602, where another candidate for the image-capturing is selected and the similar operations are repeated. If the celestial object has been extracted (affirmative determination at Step 610), the celestial object identification section 88 compares the celestial object data extracted within the area of the candidate for the image-capturing with the celestial object data within the celestial object database 86 (Step 612) to identify the extracted celestial object (Step 614). During this process, preferably the celestial object identification section 88 excludes the data on the not-emerging celestial object from the arrangement of celestial objects in the calculated current sky in order to reduce a necessary amount of operation. Further, when the precision can be taken into account, the comparison may be applied to the data on the celestial object included in a range which includes the area of the captured candidate for the image-capturing (by a field angle of the lens 80a) while also taking any error into account.

When the extracted celestial object is identified, the coordinate transformation parameter of the telescope virtual coordinate system is corrected based on the position coordinate of the extracted celestial object (Step 616).

Subsequently, it is determined whether satisfactory precision has been obtained in the above-described alignment procedure (Step 618). This determination may be made based on, for example, whether a focal distance of the image-capturing lens section 80*a* (or the resultant focal distance with the objective lens) has exceeded a predetermined value. Further, such a determination may be provided in combination, whether or not the similarity in the comparison operation relative to the celestial object database has exceeded a predetermined value. If the image has been captured in the wide angle side, since satisfactory precision has not been obtained (negative determination at Step 618), the process moves to Step 622.

At Step 622, a celestial object of attention (a first fundamental star) is selected from among the celestial objects identified at Step 614 within the current field of view or the area of candidates for image-capturing, and the telescope is controlled by a motor such that the celestial object can be introduced into the center of field (Step 622). Then, the lens section 80*b* is controlled to provide a zooming-in by one step to the telescopic side and the camera section 80*b* takes an image (Step 624). The image processing section 82 performs the image processing of the captured image data so as to extract the first fundamental star (Step 626). The process again returns to Step 612, and similar processing is repeated on the first fundamental star. In this way, as the lens section 82*b* provides the zooming-in in a step-by-step manner toward the telescopic side to finally obtain the satisfactory precision on the position of the first fundamental star (affirmative determination at Step 618), the setting of the first fundamental star is completed (Step 620). It is to be noted that in the precision determination at Step 618 in the telescopic side, satisfactory precision may be determined when the elongation between the fundamental star and the center of the field falls under the threshold value.

Subsequently, as shown in the flow chart of FIG. 19, other candidates for the image-capturing than the candidate for the image-capturing selected as the first fundamental star is selected (Step 630), and a second fundamental star setting operation is carried out in a similar manner to respective steps of FIG. 18 (Step 632 to Step 654). If finally a satisfactory precision is obtained for a position coordinate of the second fundamental star (affirmative determination at Step 646), the setting of the second fundamental star ands thus the alignment are completed (Step 648). Specifically, the coordinate transformation parameter of the telescope virtual coordinate system relative to the celestial object coordinate system has been automatically established with satisfactory precision.

To summarize the alignment procedure as shown in FIGS. 18 and 19, the following steps may be executed.

(1) The user places a telescope into a position appropriately.

(2) The automatic introduction apparatus 10*c* directs the telescope toward the appropriate direction in the sky to capture an image.

(3) The automatic introduction apparatus identifies the celestial object from the captured image so as to determine the coordinate to which the telescope is directed.

Specifically, according to the fourth embodiment, such a fully automated introduction apparatus that allows the initial setting to be almost fully automatically completed can be achieved.

It is to be noted that although such an example is shown at Step 600 of FIG. 18 in which the user positions the telescope toward a predetermined direction and/or the user inputs the initial parameters including the latitude and longitude information, these steps may be also automated by using the image-capturing unit 80. For example, if a super-wide-angle lens or a fish-eye-lens (in this case the curvature aberration should be compensated for) may be used to capture an image of a wide area of the sky, and the image processing section 82 extracts the position of constellation to identify respective celestial objects, then the arrangement of celestial objects in the current sky can be identified. The initial parameter may be automatically determined and established from this arrangement of celestial object. In this way, the user is only requested to position the telescope lens barrel to be directed toward the sky appropriately, and the process at Step 600 can be further simplified. At that time, if those areas in which the field of view is blocked by buildings or clouds are detected by the infrared telescope and the weather sensor 90, and those areas are excluded in the comparison with the celestial object database, then the automatic setting of the initial parameter can be performed quickly and reliably.

A flow of fully automated introduction by the fully automated introduction apparatus 10*c* will now be described with reference to FIG. 20.

Figure 20:
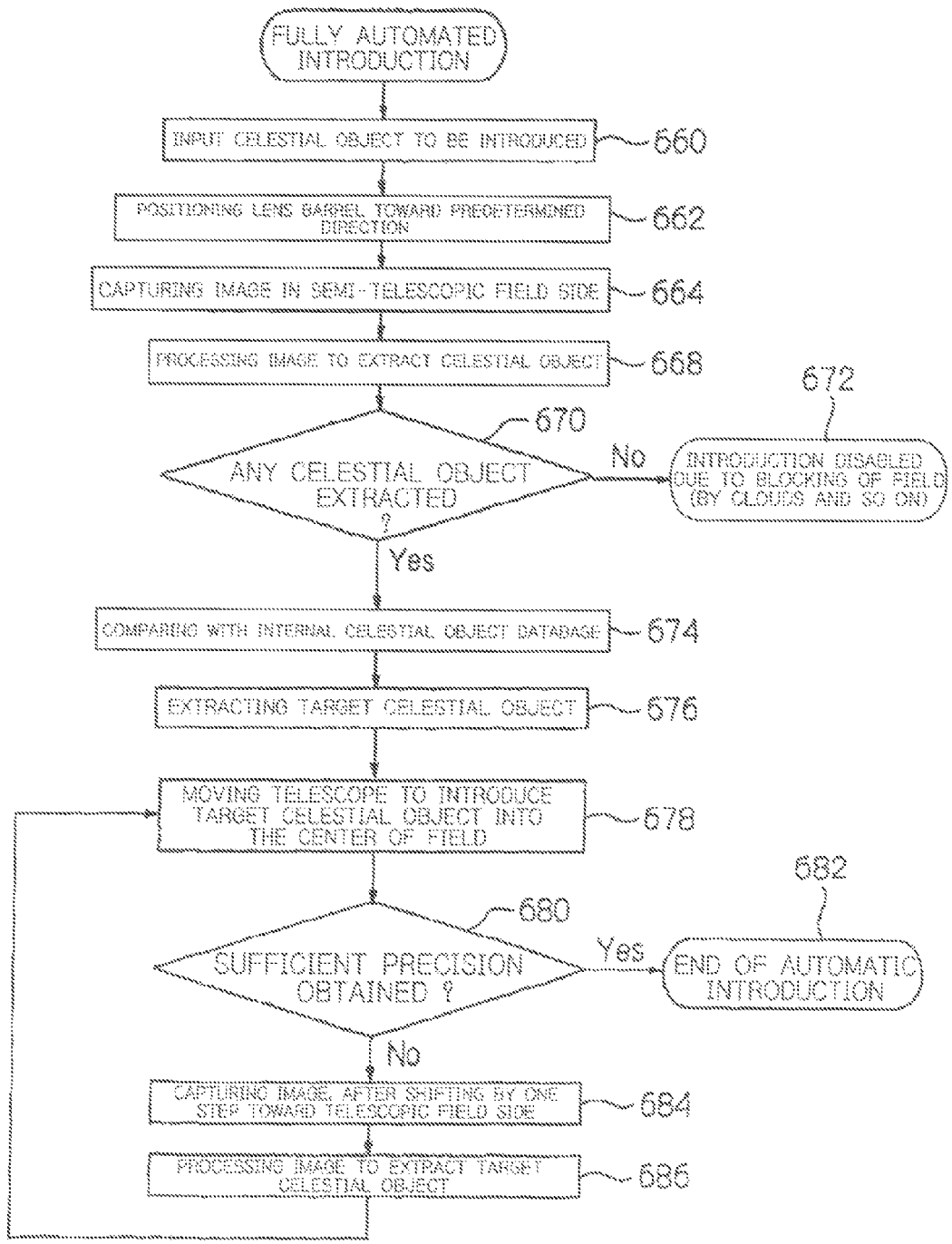
FIG. 20 is a flow chart showing a flow of processing for executing fully automated introduction of a target celestial object in a telescope having the fully automated introduction apparatus incorporated as shown in FIG. 17.

As shown in FIG. 20, firstly the user operates the controller 54 to specify a celestial object desired to be introduced (Step 660). The automatic introduction apparatus 10*c* controls a motor so as to position the telescope lens barrel to be directed toward the celestial object desired to be introduced (Step 662).

Once the control to the motor has been stopped, the lens section 80*b* is set to a semi-telescopic field, for example, and the camera section 80*b* captures an image (Step 664). The image processing section 82 provides the image processing of the captured image data and carries on the step for extracting the celestial object (Step 668). Then, it is determined whether the celestial object has been extracted within the image-capturing area (Step 670). If the celestial object has not been extracted (negative determination at Step 670), the fully automated introduction may be ended as it is determined to be impossible due to the blocking of the field by buildings, mountains or clouds (Step 672). At that time, preferably the display section of the controller 54 gives an alarm indication thereof.

If the celestial object has been extracted (affirmative determination at Step 670), the celestial object identification section 88 compares the celestial object data extracted in the image-capturing area with the celestial object data within the celestial object database 86 (Step 674) so as to extract the target celestial object and to detect the position thereof.

Subsequently, the motor control is applied to the telescope in order to introduce the extracted target celestial object into the center of the field (Step 678).

It is then determined whether the introduction has been carried out with sufficient precision (Step 680). This determination may be made based on, for example, whether a focal distance of the image-capturing lens section 80*a* (or the resultant focal distance with the objective lens) has exceeded a predetermined value, and in addition the elongation between the target celestial object position and the position in the center of field falls within a certain range. If the image has been captured in the semi-telescopic field side, the precision is not sufficient (negative determination at Step 680), and the process moves to Step 684.

At Step 684, the lens section 80*b* executes the zooming-in by one step toward the telescopic field side, in which the image is then captured by the camera section 80*b*. The image processing section 82 performs the image processing of the captured image data to extract the target celestial object (Step 686). The process returns to Step 678 again, where similar processes are repeated on the target celestial object. In this way, as the lens section 82*b* provides the zooming-in in a step-by-step manner toward the telescopic side to finally obtain the satisfactory precision on the position of the target celestial object (affirmative determination at Step 680), the fully automated introduction is ended (Step 682).

Typically, as in the automatically introduced state, the precision in the introduction has been limited due to an orthogonal error on the axes of the mount and other factors. However, in the automatic introduction apparatus 10*c* of the present embodiment, after the automatic introduction with an ordinary level of precision has been completed, the target celestial object can be identified from the captured image and introduced into the center of the field. If the scaling factor is increased by using the zooming function of the image-capturing unit, for example, the celestial object can be introduced into the center of field with higher precision.

The automatic introduction apparatus 10*c* of the present embodiment may have additional functions as follows.
(Auto-Guider Function)

Especially when taking a picture of a dark nebula or a cluster, an exposure as long as one hour or longer may be required. Even in such a case, the mount is required to track the celestial object precisely for this long period. Since in the present system, a control signal can be constantly sent so that the target celestial object can be positioned in the center of field, it can work out as an automatic tracking apparatus of high precision. If the scaling factor of the image-capturing unit 80 is increased, the tracking with much higher precision can be provided.
(Starry Sky Automatic Guide Function)

The captured image is presented on the screen of the controller and simultaneously the name of a celestial object identified by the celestial object identification function is also presented on the screen. Further, the present apparatus can provide an indication of the detailed description of the celestial object searched from the celestial object database, including, for example, a magnitude of star, a size, a coordinate and a constellation to which it belongs, and thus can work out as an automatic guide device of the sky to which the telescope is currently directed.
(New Celestial Object Searching Function)

Since the image processing section 82 has a function for extracting the celestial object and identifying the position thereof, if there is a celestial object that has been extracted but does not exist in the celestial object database 86, it may be possibly a nova, a supernova, a comet or an unregistered minor planet. In this connection, if such a celestial object has been detected, the indication of the description and image of the same celestial object may be provided to the controller 54 as a new celestial object candidate. On the other hand, since there is a possibility that the detection may caused by a noise, if a new celestial object candidate has been detected, image-capturing is carried out over the same area two or more times to verify whether the detection is caused by a noise. If so, it may contribute to the improvement of the alignment precision or the introduction precision. Further, if the position of the new celestial object candidate captured at different times with some interval therebetween has been moved, an indication of the possibility of its being a comet or a minor planet may be given. Further, the CPU 53 may have an electric mail transmission function or a FAX function so that if there is a high probability that it is new celestial object, the indication thereof may be sent to a predetermined communication site easily.

Although the respective embodiments of the present invention have been described, the present invention is not limited to them, and a variety of modifications and substitutions may be made within a scope of the present invention as defined by the appended claims.

For example, the term "telescope" referred in the specification is not simply limited to the means enabling the observation of a celestial object with the naked eye but it may encompass an image-capturing unit directed to image-capturing such as a Schmidt camera and further include an observation apparatus capable of observing not only a visible light but also an electric wave, an X-ray, a γ-ray or an infrared ray.

Further the handset 24 of FIG. 2 may be used as an electronic constellation quick reference board equipped with the function shown in FIG. 5, even though it is not connected to the telescope (or its function as a controller of the automatic introduction apparatus has been omitted).

The invention claimed is:

1. A terminal device connectable to an automatic introduction apparatus for automatically introducing a target celestial object by controlling a rotation of an astronomical telescope around at least two axes, said terminal device comprising:
    an input operation section for executing a command operation on said automatic introduction apparatus; and
    an image display section for indicating a star map image for a predetermined area on a celestial sphere in accordance with a display scale factor, said input operation section having:
        a rotation command means for executing a command operation on a rotational driving of said astronomical telescope in a telescope control mode; and
        a scale factor input means for executing an input specification of said display scale factor for said star map image displayed in said image display section, wherein in said telescope control mode, a star map image corresponding to a position on a celestial sphere toward which said astronomical telescope is headed is displayed in said image display section, while a speed of rotation of said astronomical telescope controlled by said rotation command means is changed in accordance with a decreasing function of said display scale factor specified by said scale factor input means, in which a celestial object selecting mode allows the star map image to be displayed in said image display section independently from said position on said celestial sphere toward which said astronomical telescope is headed.

2. A terminal device in accordance with claim 1, in which said celestial object selecting mode allows either of a target celestial object for automatic introduction or a fundamental celestial object for alignment to be selected over the star map image displayed in said image display section.

3. A terminal device in accordance with claim 1, wherein an operation of said rotation command means allows said star map image displayed in said image display section to be scrolled.

4. A terminal device in accordance with claim 1, in which said terminal device is equipped with a Web browser function, and said automatic introduction apparatus is equipped with a Web server function, wherein
    said terminal device is configured to perform two-way data communication with said automatic introduction apparatus via an electric communication means.

5. A terminal device in accordance with claim 4, in which said terminal device and said automatic introduction apparatus are configured to perform two-way data communication with one or more additional automatic introduction apparatus each equipped with a Web server function via said electric communication means.

6. A terminal device in accordance with claim 4, in which said terminal device and said automatic introduction apparatus are configured to perform two-way data communication with one or more additional terminal devices each equipped with a Web browser function via said electric communication means.

7. A terminal device in accordance with claim 4, in which said terminal device and said automatic introduction apparatus are configured to perform two-way data communication with one or more additional terminal devices each equipped with a Web browser function and one or more additional automatic introduction apparatus each equipped with a Web server function via said electric communication means.

8. A terminal device in accordance with claim 6, in which said one or more additional terminal devices at least includes an input operation terminal for inputting a command to said automatic introduction apparatus and a display terminal for indicating a set of received input and output information.

9. A terminal device in accordance with claim 7, in which said one or more additional terminal devices at least includes an input operation terminal for inputting a command to said automatic introduction apparatus and a display terminal for indicating a set of received input and output information.

* * * * *

UNITED STATES PATENT AND TRADEMARK OFFICE
CERTIFICATE OF CORRECTION

| | |
|---|---|
| PATENT NO. | : 8,279,522 B2 |
| APPLICATION NO. | : 12/816630 |
| DATED | : October 2, 2012 |
| INVENTOR(S) | : Norimasa Fujimoto et al. |

Page 1 of 1

It is certified that error appears in the above-identified patent and that said Letters Patent is hereby corrected as shown below:

On the Title Page, Item (62) should read (62) Division of application No. 10/559,141, filed as application No. PCT/JP2004/007496 on May 31, 2004, now Pat. No. 7,769,475.

On the Title Page, Item (30) should read (30) Foreign Application Priority Data
May 30, 2003 (WO) ........................PCT/JP03/06877

Signed and Sealed this
Twelfth Day of February, 2013

Teresa Stanek Rea
*Acting Director of the United States Patent and Trademark Office*